(12) United States Patent
Tan et al.

(10) Patent No.: US 9,869,836 B2
(45) Date of Patent: Jan. 16, 2018

(54) OPTICAL INTERCONNECTS

(75) Inventors: Michael Renne Ty Tan, Menlo Park, CA (US); Shih-Yuan Wang, Palo Alto, CA (US); Paul Kessler Rosenberg, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1241 days.

(21) Appl. No.: 12/812,937

(22) PCT Filed: Jan. 30, 2008

(86) PCT No.: PCT/US2008/001296
§ 371 (c)(1),
(2), (4) Date: Jul. 14, 2010

(87) PCT Pub. No.: WO2009/096918
PCT Pub. Date: Aug. 6, 2009

(65) Prior Publication Data
US 2011/0052120 A1    Mar. 3, 2011

(51) Int. Cl.
*G02B 6/43* (2006.01)
(52) U.S. Cl.
CPC .................................. *G02B 6/43* (2013.01)
(58) Field of Classification Search
None
See application file for complete search history.

(56) References Cited

U.S. PATENT DOCUMENTS

| | | | |
|---|---|---|---|
| 4,936,657 A * | 6/1990 | Tejima et al. | 349/7 |
| 5,165,104 A | 11/1992 | Weverka | |
| 5,208,701 A * | 5/1993 | Maeda | 359/574 |
| 5,297,068 A | 3/1994 | Guilfoyle | |
| 5,394,490 A * | 2/1995 | Kato et al. | 385/14 |
| 5,432,722 A | 7/1995 | Guilfoyle | |
| 5,574,597 A | 11/1996 | Kataoka | |
| 5,793,912 A | 8/1998 | Boord et al. | |
| 5,877,876 A * | 3/1999 | Birdwell | 349/39 |
| 6,128,109 A | 10/2000 | Jenkins | |
| 6,256,153 B1 * | 7/2001 | Suzui | 359/642 |

(Continued)

FOREIGN PATENT DOCUMENTS

| CN | 201072068 Y * | 6/2008 |
|---|---|---|
| DE | 4221850 | 1/1994 |

(Continued)

*Primary Examiner* — Andrew Jordan
(74) *Attorney, Agent, or Firm* — Olympic Patent Works PLLC

(57) ABSTRACT

Various embodiments of the present invention are directed to optical interconnects. In one embodiment of the present invention, an optical interconnect comprises a laser configured to output an optical signal and a laser-diode driver electronically coupled to the laser. The laser-diode driver induces the laser to output the optical signal in response to an electrical signal received by the laser-diode driver. The optical interconnect includes a diffractive optical element and a plurality of photodetectors. The optical interconnect is positioned to receive the optical signal and configured to split the optical signal into a plurality of optical signals, and each photodetector converts one of the plurality of optical signals into an electrical signal that is output on a separate signal line.

21 Claims, 22 Drawing Sheets

(56) References Cited

U.S. PATENT DOCUMENTS

| | | | |
|---|---|---|---|
| 6,285,493 B1* | 9/2001 | Carrott et al. | 359/311 |
| 6,307,675 B1* | 10/2001 | Abe et al. | 359/457 |
| 6,445,470 B1 | 9/2002 | Jenkins | |
| 6,585,382 B1 | 7/2003 | Stone | |
| 6,690,851 B1 | 2/2004 | Guilfoyle | |
| 6,868,207 B2 | 3/2005 | Wickman | |
| 6,894,970 B1* | 5/2005 | McDermott et al. | 370/220 |
| 7,058,010 B2* | 6/2006 | Chidambaran et al. | 370/218 |
| 7,221,507 B2* | 5/2007 | Hirata et al. | 359/457 |
| 7,324,225 B2* | 1/2008 | Ozeki et al. | 358/1.15 |
| 7,342,887 B1* | 3/2008 | Sindhu et al. | 370/235 |
| 7,672,585 B2* | 3/2010 | Sone et al. | 398/45 |
| 7,720,377 B2* | 5/2010 | Snider et al. | 398/45 |
| 8,062,753 B2* | 11/2011 | Schreder et al. | 428/426 |
| 2002/0067882 A1* | 6/2002 | Guilfoyle | 385/24 |
| 2002/0093677 A1* | 7/2002 | Ozeki et al. | 358/1.15 |
| 2003/0002770 A1* | 1/2003 | Chakravorty et al. | 385/14 |
| 2004/0109164 A1* | 6/2004 | Horii et al. | 356/479 |
| 2004/0156640 A1 | 8/2004 | Dress | |
| 2004/0263841 A1 | 12/2004 | Caracci et al. | |
| 2005/0018295 A1 | 1/2005 | Mendlovic | |
| 2005/0147365 A1* | 7/2005 | Benner et al. | 385/115 |
| 2006/0171033 A1* | 8/2006 | Schreder et al. | 359/566 |
| 2006/0210213 A1* | 9/2006 | Huang et al. | 385/14 |
| 2007/0146624 A1* | 6/2007 | Duston et al. | 349/193 |
| 2009/0103854 A1* | 4/2009 | Beausoleil et al. | 385/14 |
| 2009/0274413 A1* | 11/2009 | Beausoleil et al. | 385/14 |
| 2011/0052120 A1* | 3/2011 | Tan et al. | 385/33 |

FOREIGN PATENT DOCUMENTS

| | | | |
|---|---|---|---|
| JP | 62134602 A * | 6/1987 | G02B 3/08 |
| JP | 1991-060080 | 3/1991 | |
| JP | 07-077627 | 3/1995 | |
| JP | 2000-058983 | 2/2000 | |
| JP | 2002-503837 | 2/2002 | |
| JP | 2005283976 A * | 10/2005 | G03B 21/62 |
| JP | 2006-509384 | 3/2006 | |
| WO | 99/41858 | 8/1999 | |
| WO | 02/093843 | 11/2002 | |
| WO | 2004006618 | 1/2004 | |

* cited by examiner

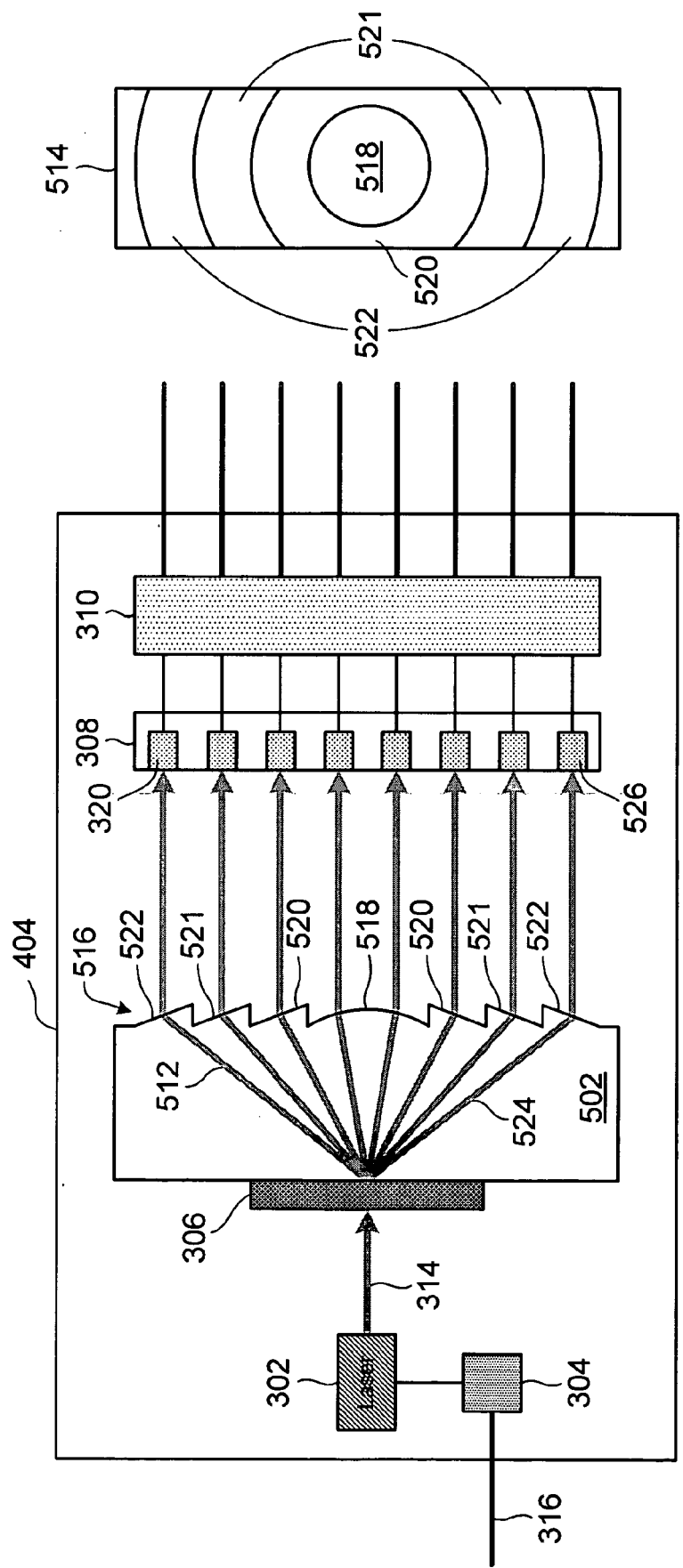

OPTICAL INTERCONNECTS

TECHNICAL FIELD

Embodiments of the present invention are directed to optical interconnects that can be used to interconnect electronic devices.

BACKGROUND

An intrinsic problem shared by computer system manufacturers is the need for increased computer system performance without a commensurate increase in energy consumption or cost. Developers of electrical communication architectures struggle to balance the dichotomy for increased performance required of electronic systems while addressing lower power consumption, smaller form factor, and lower electromagnetic emissions. Better solutions dealing with scalability while reducing power consumption in computer systems are desirable. However, typical electronic solutions to these problems may increase the cost of many computer systems because of increased pin count and/or die area, and because of increased power consumption, a major cause of which is the need to communicate over long signal lines.

Increasing system performance of one or more dual in-line memory modules ("DIMMs") is just one of many computer system examples of how energy consumption and costs increase while attempting to increase DIMM performance. A DIMM is a small circuit board that contains a number of discrete, dynamic random access memory ("DRAM") chips that are connected to a memory controller using electronic interconnects forming one or more channels on a system board. There are many ways to increase DIMM performance, such as increasing capacity, increasing the number of channels, increasing the number of DRAM banks or ranks, improving bandwidth, decreasing latency, or some combination of these ways. However, typical electronic solutions to these problems often increase the cost of the memory modules either because of increased pin count and/or die area, or increased power consumption. As mentioned above, a major cause of the increased power consumption is the need to communicate over long signal lines. Increasing the front side bus speed also causes a linear increase in interface power consumption. An additional interconnect issue associated with increasing the number of DIMM ranks at increased front side bus speeds is that both signal timing and noise are problems in the multi-drop signal lines that connect multiple DIMMs. This so called "stub electronics" problem has led to memory buses being replaced by point to point memory channels requiring additional external buffers to interface to the DRAMs. However, most DRAM efforts have focused on the creation of higher density memory devices with an electrical DIMM to processor chip interconnect.

Engineers have recognized a need for high-speed, high-bandwidth interconnects without the power and cost considerations associated with additional pins and long signal lines and which also maintains signal integrity.

BRIEF DESCRIPTION OF THE DRAWINGS

FIGS. 5A-5B show cross-sectional views and schematic representations of two different focusing elements, each of which is configured in accordance with embodiments of the present invention.

FIG. 5C shows a frontal-view of the Fresnel lens surface.

DETAILED DESCRIPTION

Various embodiments of the present invention are directed to optical interconnects that are capable of providing high-speed, high-bandwidth interconnections between electronic devices but with lower power consumption and fabrication costs than implementing additional pins and signal lines. In the following description, the terms "optical" and "optically" refer to devices that operate with classical and/or quantized electromagnetic radiation ("optical signal") having wavelengths or frequencies that are not limited to just the visible portion of the electromagnetic spectrum.

Figure 1:
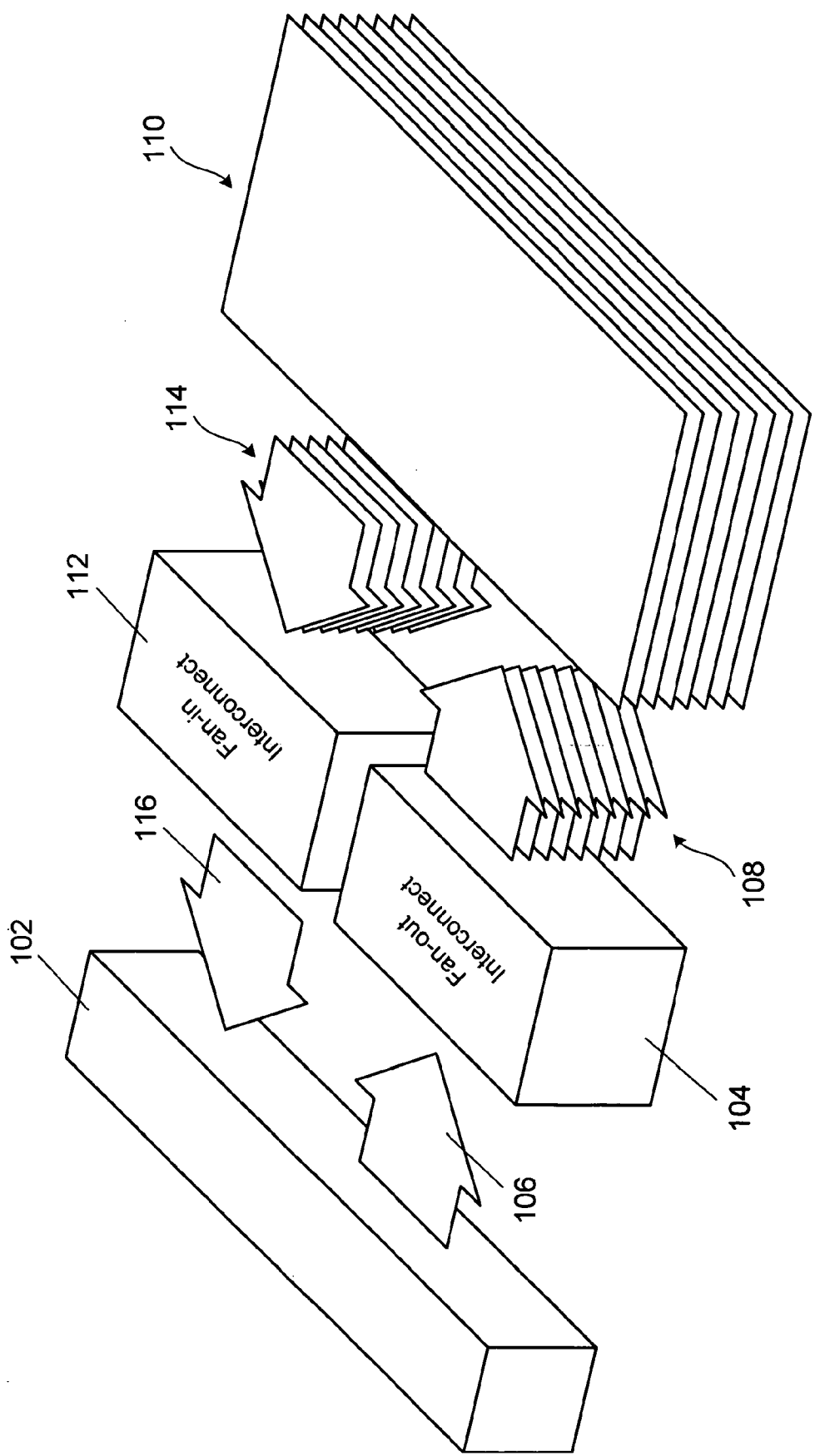
FIG. 1 shows an isometric view and first schematic representation of two optical interconnects operated in accordance with embodiments of the present invention.

Certain optical interconnect embodiments can be used to broadcast or "fan-out" information output from a single electronic device to a plurality of electronic devices, while other optical interconnect embodiments can be used to "fan-in" information output from a plurality of electronic devices to a single electronic device. FIG. 1 shows an isometric view and schematic representation of two optical interconnects operated in accordance with embodiments of the present invention. As shown in FIG. 1, an electronic device 102 transmits data to a fan-out optical interconnect 104 in the form of modulated (i.e., data encoded) electrical signals represented by a directional arrow 106. The fan-out optical interconnect 104 transmits or broadcasts the data in the form of modulated electrical signals represented by eight directional arrows 108 to all eight electronic devices arranged in a stack 110. FIG. 1 also shows a fan-in optical interconnect 112 that receives modulated electrical signals output from each of the electronic devices in the stack 110 as indicated by eight directional arrows 114 and transmits each modulated electrical signal to the electronic device 102 as indicated by a directional arrow 116. Not all of the electrical signals 114 are transmitted simultaneously to the fan-in optical interconnect 112. An arbiter (not shown) 118 may be used to control which of the electronic devices in the stack 110 transmits an electrical signal to the fan-in optical interconnect 112.

The fan-out optical interconnect 104 converts electrical signals received from the electronic device 102 into eight approximately identical optical signals that are converted into eight electrical signals. All of the eight electrical signals are transmitted separately to the electronic devices in the stack 110. The fan-in interconnect 112 receives separately eight electrical signals output from the electronic devices in the stack 110. These electrical signals are each converted into an optical signal within the fan-in interconnect 112 and converted back into an electrical signal that is output to the electronic device 102. Note that optical interconnect embodiments of the present invention are not limited to transmitting electrical signals to and from eight electronic devices. In other embodiments of the present invention, the fan-in and fan-out optical interconnects can be configured to transmit electrical signals to any number of electronic devices.

The electronic device 102 and electronic devices in the stack 110 can represent different kinds of computational and data storage devices. For example, in certain embodiments, the electronic devices in the stack 110 can represent eight DIMMs, and the electronic device 102 can represent a memory controller that manages the flow of data transmitted to and from the DIMMs. In still other embodiments, the electronic device 102 can represent an external storage device, and the electronic devices in the stack 110 can represent eight blade servers mounted in an enclosure or chassis (not shown) or eight chassis. In still other embodiments, the electronic devices in the stack 110 can represent I/O cards or network interface cards.

Figure 2:
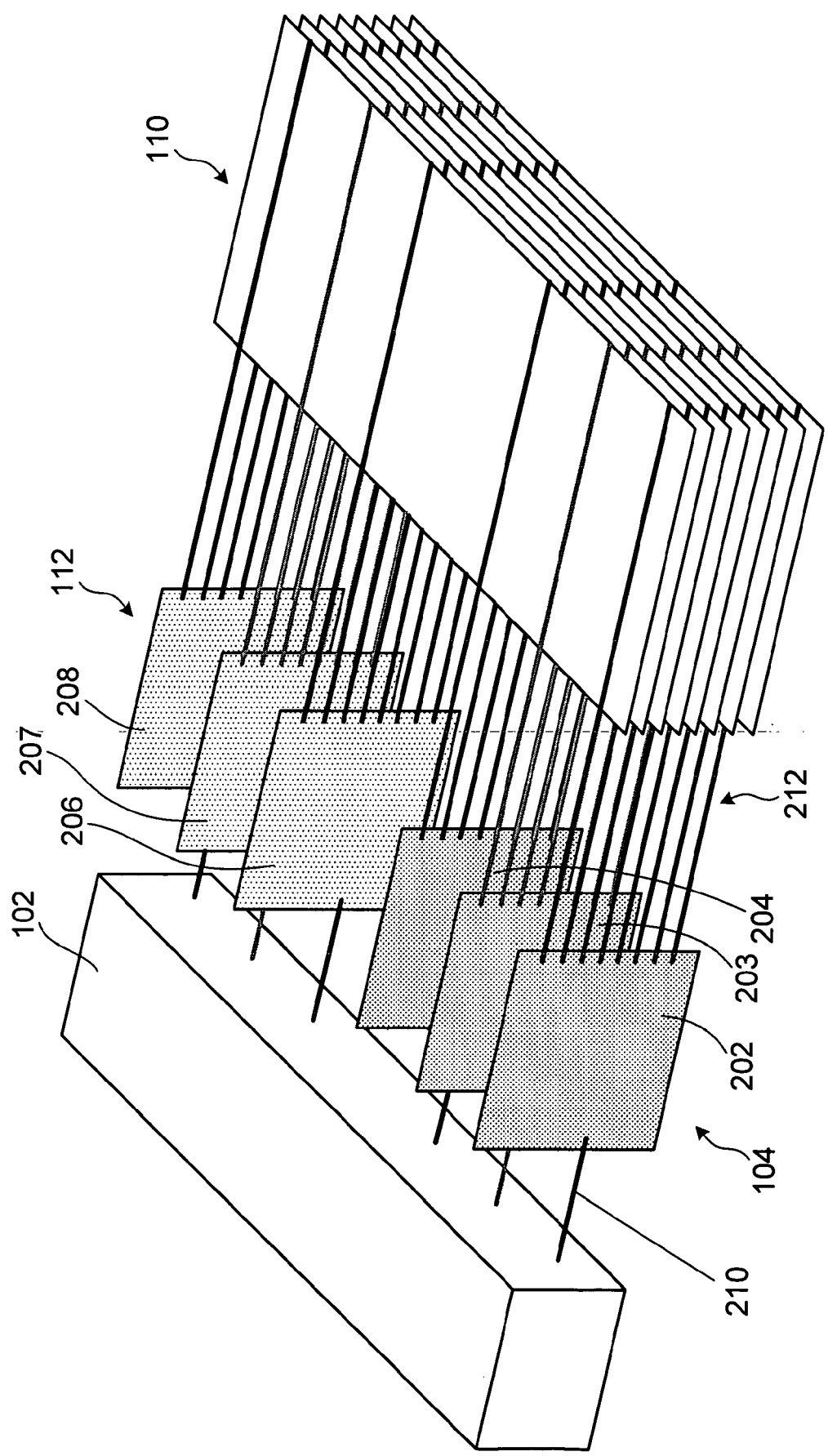
FIG. 2 shows an isometric view of a first implementation of a fan-out optical interconnect and a fan-in optical interconnect in accordance with embodiments of the present invention.

The fan-out and fan-in optical interconnects 104 and 112 can be implemented in a number of different ways. FIG. 2 shows an isometric view of a first implementation of a fan-out optical interconnect and a fan-in optical interconnect in accordance with embodiments of the present invention. In FIG. 2, the fan-out optical interconnect 104 is implemented using three cards 202-204, and the fan-in optical interconnect 112 is also implemented using three cards 206-208. Each card includes a single signal line connected to the electronic device 102 and eight separate signal lines, each of which is connected to a corresponding electronic device in the stack 110. For example, the card 202 includes a single signal line 210 for receiving electrical signals output from the electronic device 102 and eight signal lines 212 for separately transmitting electrical signals to each of the electronic devices in the stack 110. Note that embodiments of the present invention are not limited to using three cards for the fan-in and fan-out optical interconnects. In other embodiments, any suitable number of cards can be used to implement the fan-in and fan-out optical interconnects 104 and 112. In addition, the cards are not limited to eight signal lines. In other embodiments, the number of signals may depend on the number of electronic devices.

Figure 3:
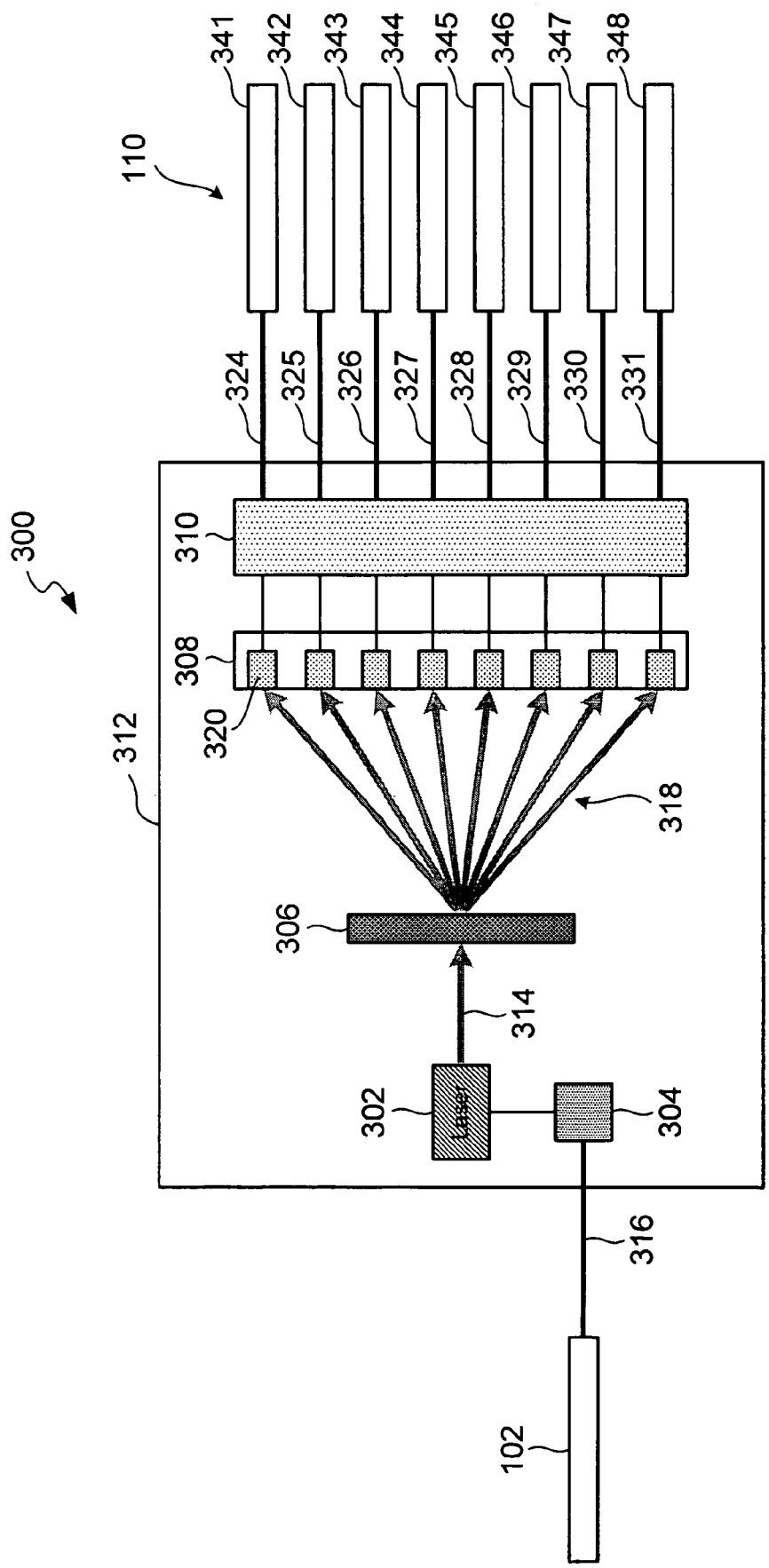
FIG. 3 shows a schematic representation of a first fan-out optical interconnect card configured in accordance with embodiments of the present invention.

FIG. 3 shows a schematic representation of a first fan-out optical interconnect card 300 configured in accordance with embodiments of the present invention. The fan-out optical interconnect 300 comprises a laser 302, a laser driver 304, a diffractive optical element 306, a photodetector array 308, and a transimpedance amplifier 310 all of which can be mounted on a single substrate 312. The laser 302 can be a vertical-cavity surface-emitting laser ("VCSEL"), a distributed feedback laser ("DFL"), a quantum well laser, a multiple quantum well laser, a double heterostructure laser, a light-emitting diode ("LED"), or any other device suitable for emitting a single optical signal 314. The laser 302 is electronically coupled to the laser driver 304 which receives electrical signals from the electronic device 102 via the signal line 316. The laser driver 304 can be an integrated circuit that is configured to direct the laser 302 to generate the optical signal 314. The diffractive optical element 306 can be a diffractive beam splitter or a diffractive grating and can be configured to split the optical signal 314 into eight separate, beams of nearly identical optical power, and approximately equidistant optical signals 318. The design of the diffractive optical element 306 is well-known in the art. The photodetector array 308 comprises eight separate photodetectors, such as photodetector 320. Each photodetector can be positioned to detect one of the eight optical signals 318 emitted from the diffractive optical element 306. The photodetectors can be p-n or p-i-n junction photodiodes, or n-p-n or p-n-p phototransistors. The photodetectors of the photodetector array 308 are each electronically coupled to the transimpedance amplifier 310 which amplifies the electrical signal output from each of the photodetectors and simultaneously places the electrical signals onto corresponding signal lines 324-331 which are electronically coupled to the electronic devices 341-348 of the stack 110. In addition to amplifying the electrical signal output from each of the photodetectors, the transimpedance amplifier 310 reduces the signal-to-noise ratio and provides a faster response time than using a resistor after each photodetector.

The fan-out optical interconnect 300 can be operated as follows. The electronic device 102 outputs a modulated (i.e., data-encoded) electrical signal on the signal line 316. The laser driver 304 receives the modulated electrical signal and directs the laser 302 to emit a corresponding modulated optical signal 314 which is directed to the diffractive optical element 306. The diffractive optical element 306 splits the modulated optical signal 314 into eight separate and nearly identical modulated optical signals 318, each of which is directed to a corresponding photodetector in the photodetector array 308. Each photodetector converts a corresponding modulated optical signal into a modulated electrical signal that is amplified by the transimpedance amplifier 310 and transmitted to the eight electronic devices 341-348, which all receive substantially the same modulated electrical signal. In other words, the fan-out optical interconnect 300 broadcast nearly identical electrical signals to each of the electronic devices 341-348 in the stack 110.

Figure 4:
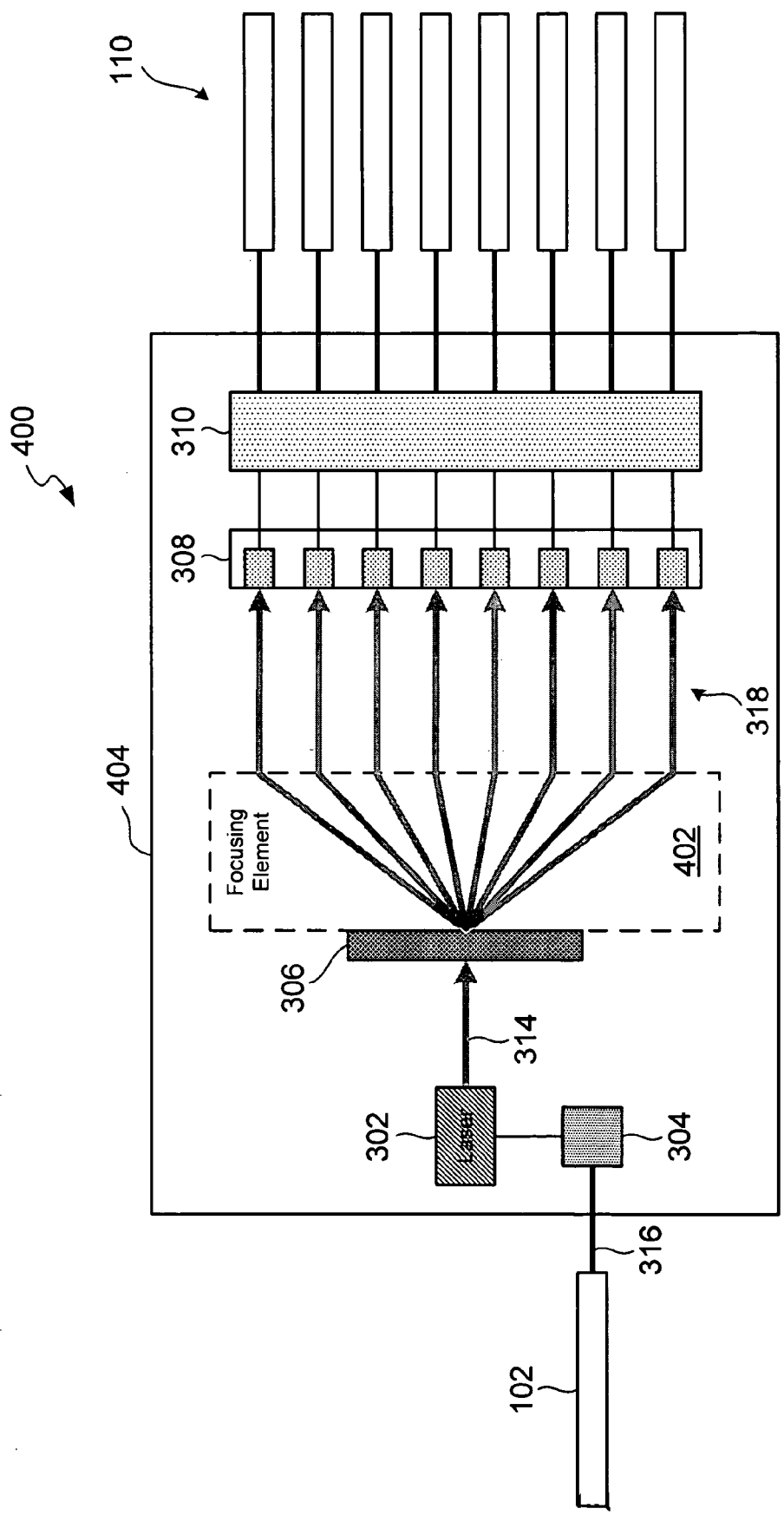
FIG. 4 shows a schematic representation of a second fan-out optical interconnect card configured in accordance with embodiments of the present invention.

In other embodiments of the present invention, an optical element may be included in the fan-out optical interconnect in order direct the optical signals 318 output from the diffractive optical element 306 onto each of the photodetectors of the photodetector array 308. FIG. 4 shows a schematic representation of a second fan-out optical interconnect card 400 configured in accordance with embodiments of the present invention. The optical interconnect 400 is nearly identical to the optical interconnect 300 except the optical interconnect 400 includes a focusing element 402 disposed on the surface of a substrate 404 adjacent to the diffractive optical element 306. The optical signals output from the diffractive optical element 306 are redirected by the focusing element 402 to corresponding photodetectors of the photodetector array 308. The focusing element 402 may include substantially regularly spaced prisms configured with different shapes and angles to output beams which are focused onto corresponding detectors of the detector array 308.

Figure 5A:
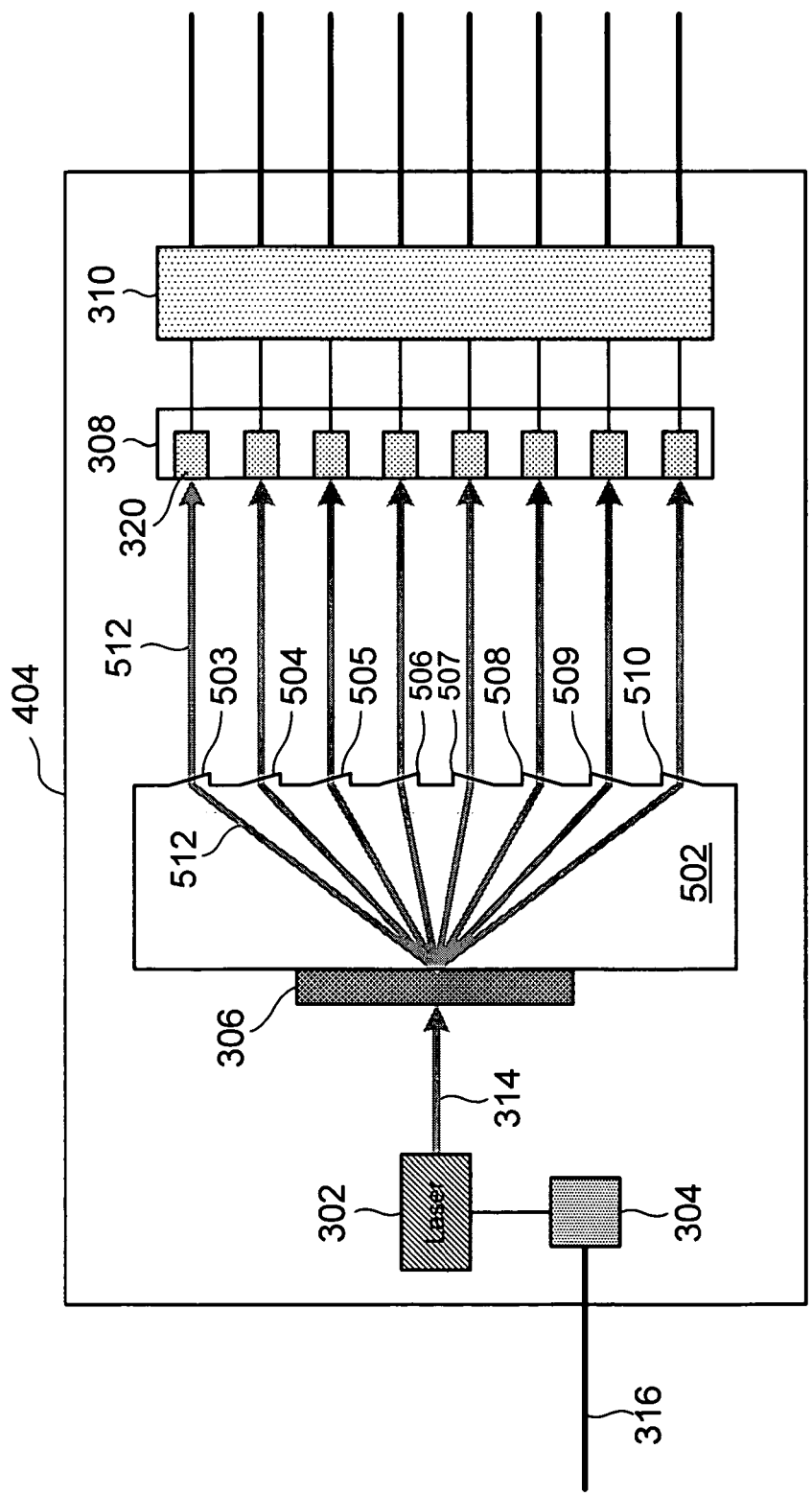

In various embodiments, the focusing element 402 can be configured in a number of different ways. FIGS. 5A-5B show cross-sectional views and schematic representations of two different focusing elements, each of which is configured in accordance with embodiments of the present invention. In FIG. 5A, a first focusing element 502 includes substantially regularly spaced prisms 503-510 protruding from a surface opposite the surface adjacent to the diffractive optical element 306. Each prism is positioned and configured with a particular incidence angle to redirect an optical signal output from the diffractive optical element 306 toward a corresponding photodetector of the photodetector array 308. For example, the prism 503 redirects the optical signal 512 toward the photodetector 320. In FIG. 5B, a second focusing element 514 includes a spherically contoured Fresnel lens surface 516 located opposite the surface adjacent to the diffractive optical element 306. FIG. 5C shows a frontal-view of the Fresnel lens surface 516. The Fresnel lens surface 516 includes a central convex region 518 and concentric tapered prism-shaped rings 520-522 called "Fresnel rings." The Fresnel rings 520-522 are tapered to direct optical signals toward corresponding photodetectors of the photodetector array 308. For example, the Fresnel ring 522 is tapered to redirect the optical signals 512 and 524 to the photodetectors 320 and 526, respectively.

Figure 6:
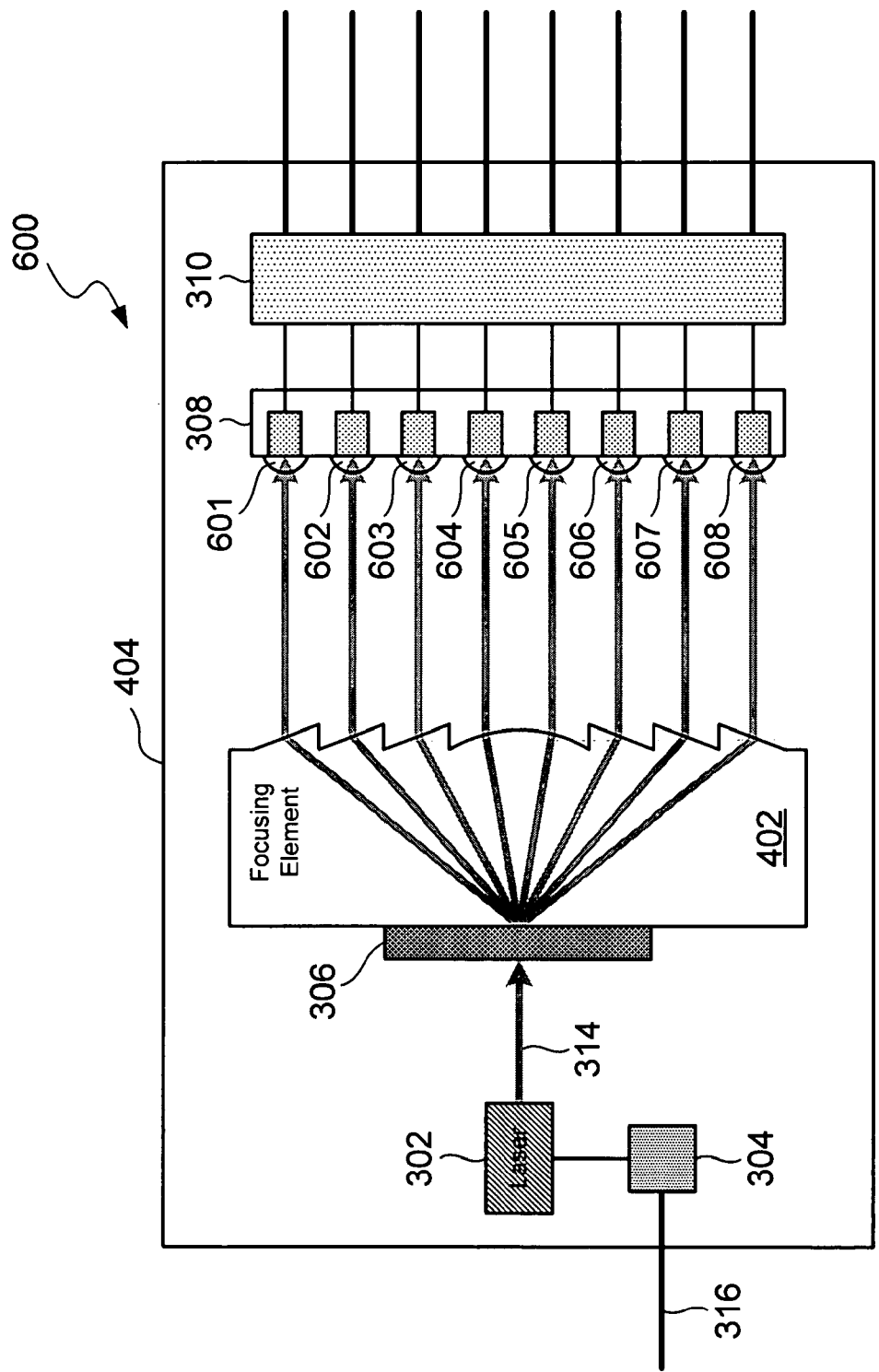
FIG. 6 shows an optical interconnect card that includes plano-convex lenses placed on each of the photodetectors of a photodetector array in accordance with embodiments of the present invention.

In other embodiments, plano-convex lenses can be placed on each of the photodetectors of the photodetector array 308. FIG. 6 shows an optical interconnect card 600 with plano-convex lenses 601-608 placed on the photodetectors of the photodetector array 308 in accordance with embodiments of the present invention. Each plano-convex lens can be used to help collect an optical signal output from the optical element 402 and direct the optical signal onto a corresponding photodetector of the photodetector array 308.

Figure 7:
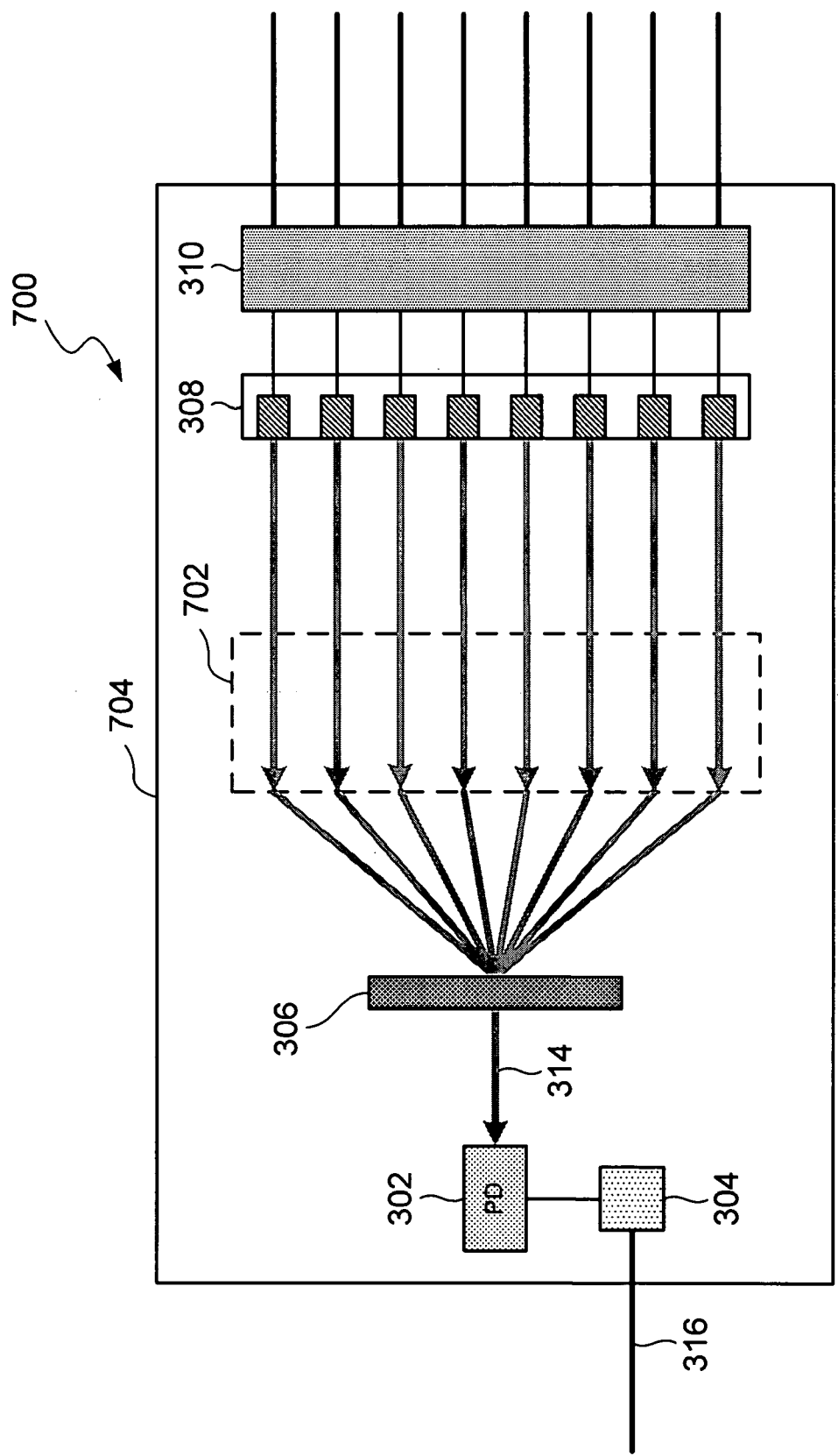
FIG. 7 shows a schematic representation of a third fan-out optical interconnect card 700 configured in accordance with embodiments of the present invention.

FIG. 7 shows a schematic representation of a third fan-out optical interconnect card 700 configured in accordance with embodiments of the present invention. The optical interconnect 700 is nearly identical to the optical interconnect 300 except the optical interconnect 700 includes a focusing element 702 disposed on the surface of a substrate 704 between the diffractive optical element 306 and the photodetector array 310. The optical signals output from the diffractive optical element 306 are redirected by focusing element 702 to corresponding photodetectors of the photodetector array 308.

Figure 8A:
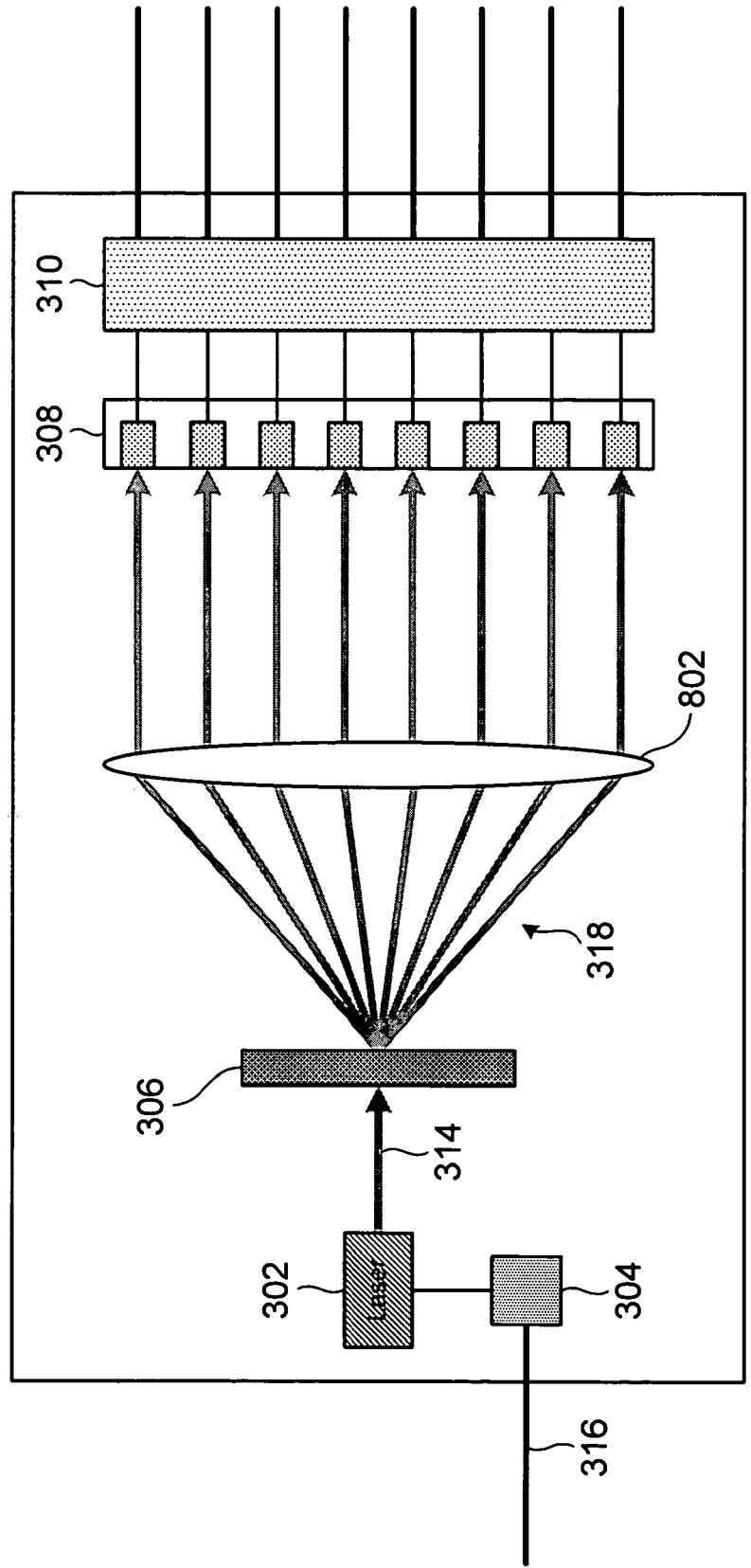
FIGS. 8A-8C show cross-sectional views and schematic representations of three different focusing elements, each of which is configured in accordance with embodiments of the present invention.
Figure 8B:
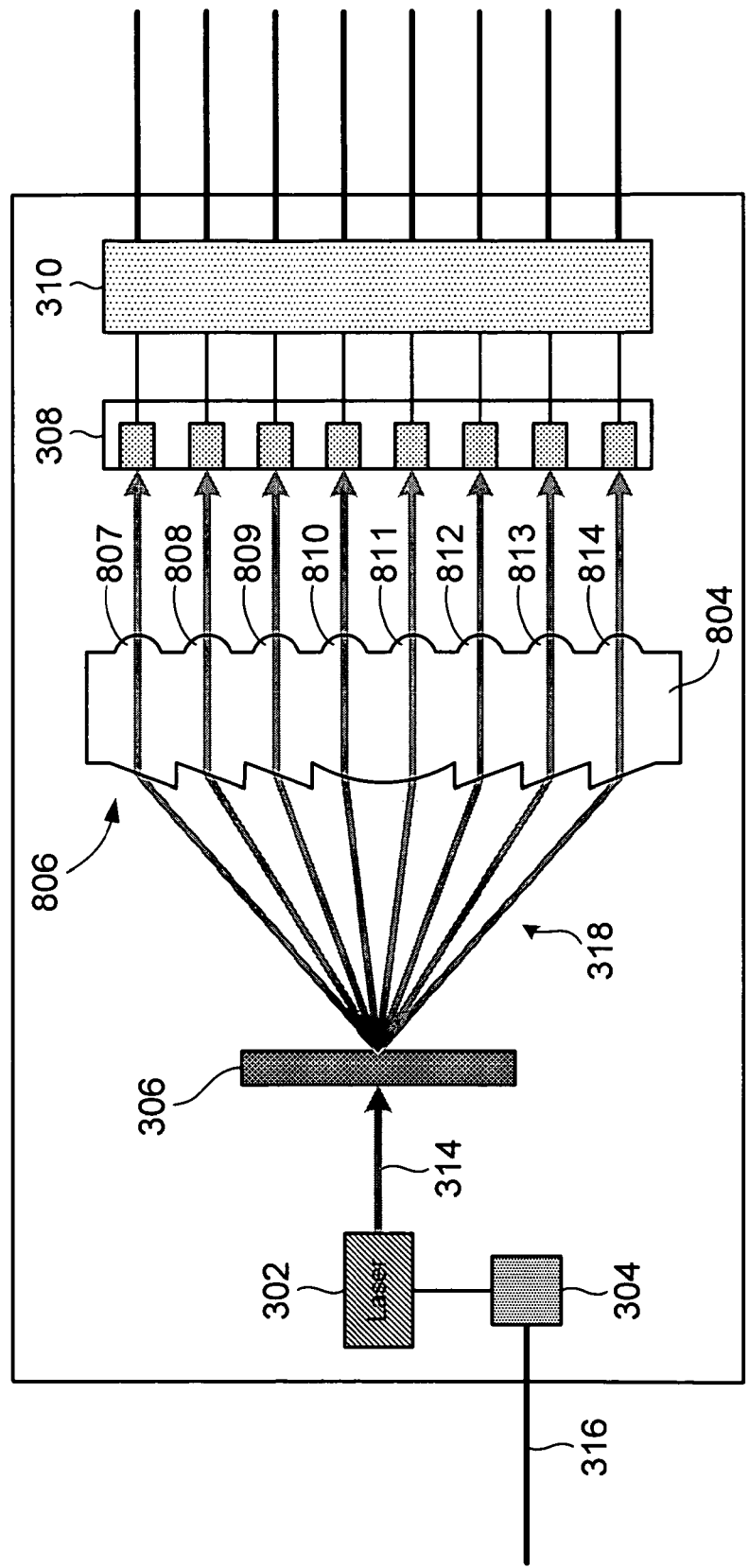
Figure 8C:
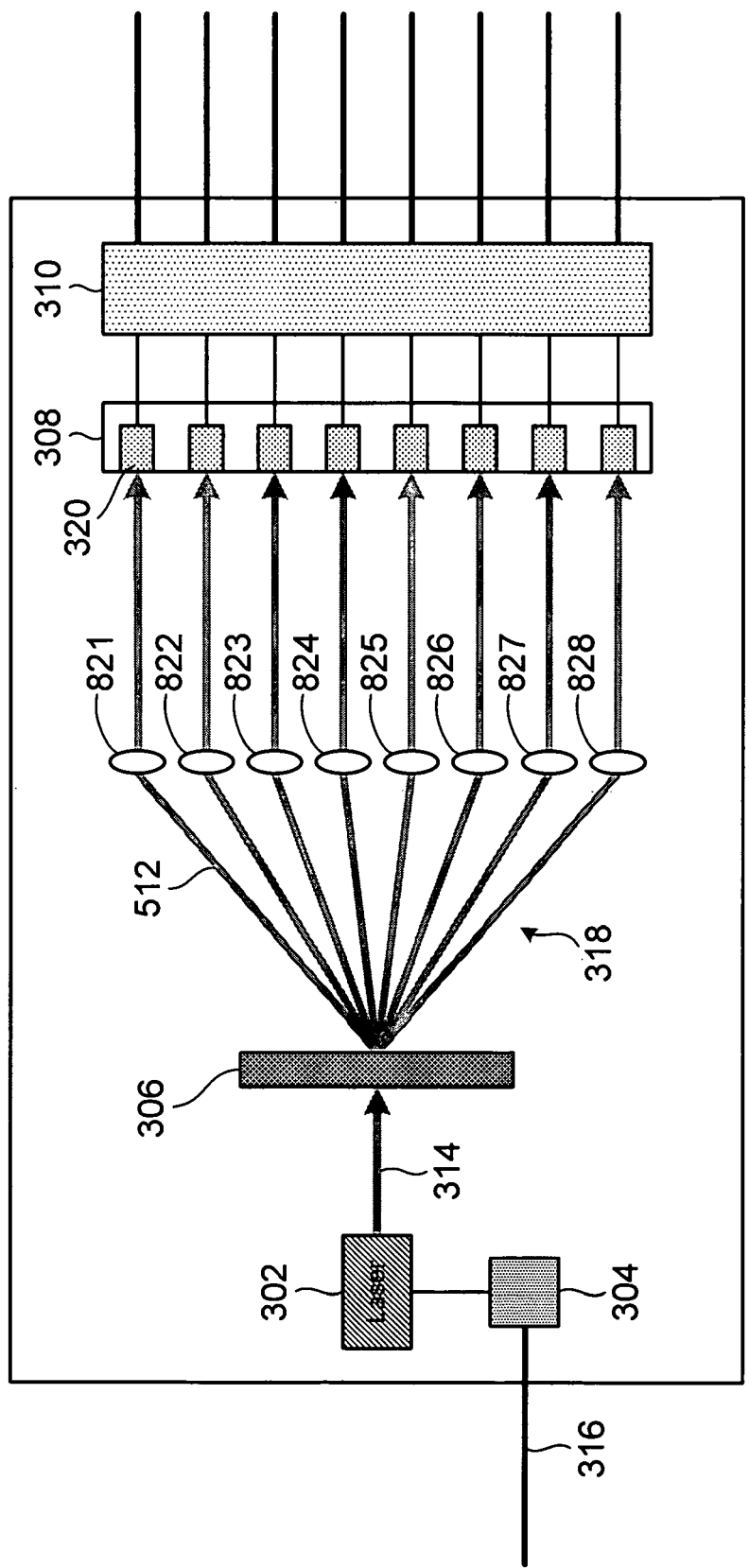

In different embodiments, the focusing element 702 can be configured in a number of different ways. FIGS. 8A-8C show cross-sectional views and schematic representations of three different focusing elements, each of which is configured in accordance with embodiments of the present invention. In FIG. 8A, the focusing element is a single biconvex lens 802 configured to direct each of the optical signals 318 to a corresponding photodetector of the photodetector array 308. In FIG. 8B, an optical element 804 includes a Fresnel lens surface 806 and an opposing surface having a number of plano-convex lenses 807-814. The Fresnel lens surface 806 is configured as described above with reference to FIGS. 5B-5C. The Fresnel rings are tapered to redirect the optical signals 318 along substantially parallel paths through the focusing element 804. The plano-convex lenses 807-814 are configured to focus the optical signals onto corresponding photodetectors of the photodetector array 308. In FIG. 8C, the focusing element comprises eight biconvex lens 821-828 positioned between the diffractive optical element 306 and the photodetector array 308. Each lens can be configured to direct one of the optical signals 318 output from the diffractive optical element 306 toward a corresponding photodetector of the photodetector array 308. For example, the lens 821 is positioned and configured to direct the optical signal 512 onto the photodetector 320. In other embodiments, the focusing element 702 can be refractive plano-convex lens.

Figure 9A:
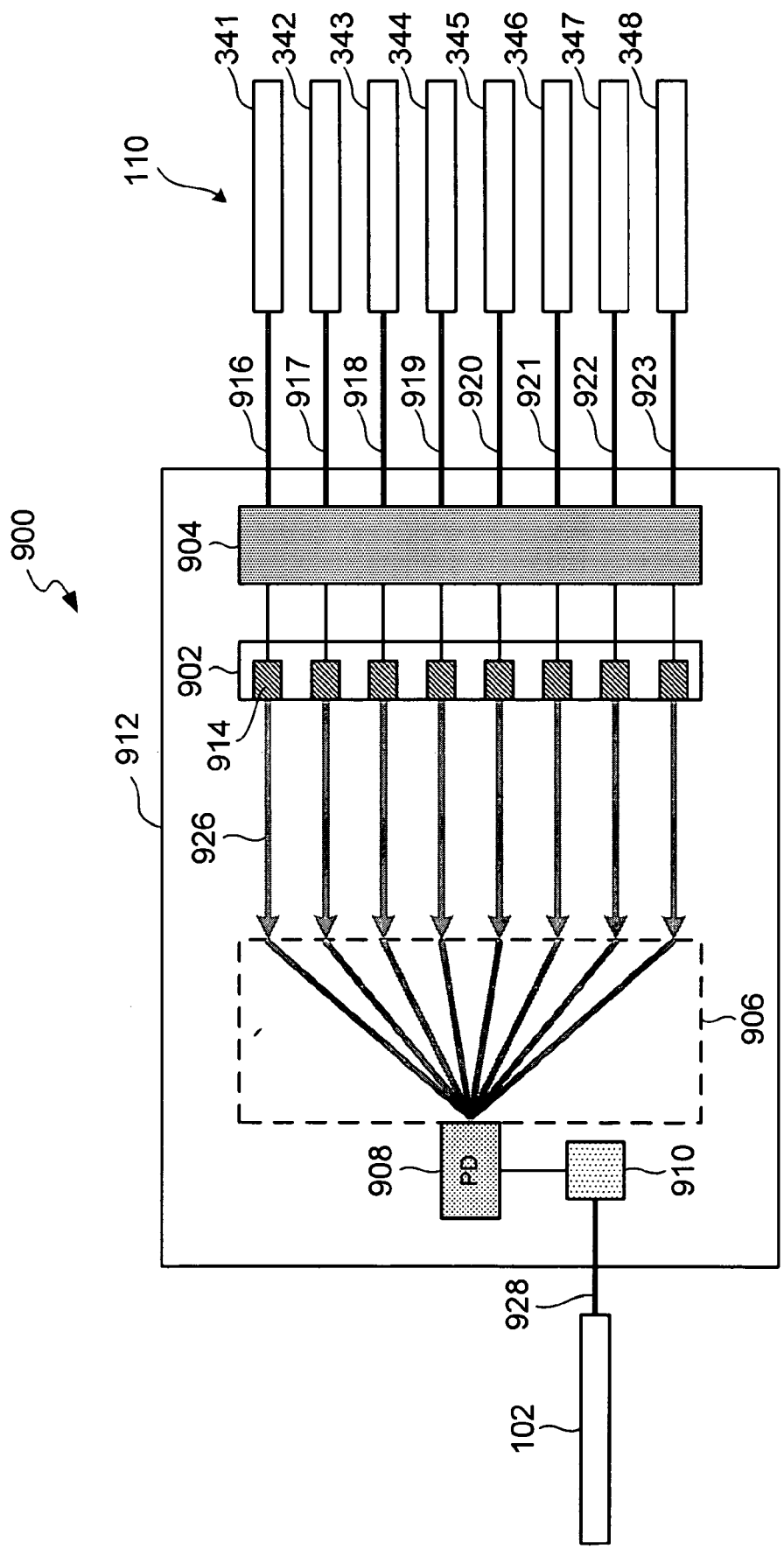
FIG. 9A shows a schematic representation of a first fan-in optical interconnect card 900 configured in accordance with embodiments of the present invention.

FIG. 9A shows a schematic representation of a first fan-in optical interconnect card 900 configured in accordance with embodiments of the present invention. The fan-in optical interconnect 900 comprises a laser array 902, a laser driver 904, a focusing element 906 adjacent to a photodetector 908, and a transimpedance amplifier 910 all of which can be mounted on a single substrate 912. The laser array 902 comprises eight lasers, such as laser 914. The lasers can be VCSELs, DFLs, quantum well lasers, multiple quantum well lasers, double heterostructure lasers, LEDs, or any other devices that are suitable device for emitting a single optical signal. Each laser in the laser array 902 is electronically coupled to the laser driver 904 and positioned, as show in FIG. 6, to emit a optical signal onto the focusing element 906. The laser driver 904 receives modulated (i.e., data encoded) electrical signals on signal lines 916-923 from the corresponding electronic devices 341-348 in the stack 110. The laser driver 904 can be an integrated circuit that supplies a separate modulated current to each laser in the laser array 602. Note that the laser driver 904 does not simultaneously receive electrical signals from all eight of the electronic devices 341-348 in the stack 110. An arbiter can be employed so that only one of the electronic devices 341-348 transmits an electrical signal while the other seven electronic devices wait. The photodetector 908 is positioned to detect an optical signal redirected by the focusing element 906. The photodetector 908 can be a p-n or a p-i-n junction photodiode, or a n-p-n or p-n-p phototransistor. The transimpedance amplifier 910 is electronically coupled to the photodetector 908 and outputs modulated electrical signals on a signal line 928 to the electronic device 102.

Figure 9B:
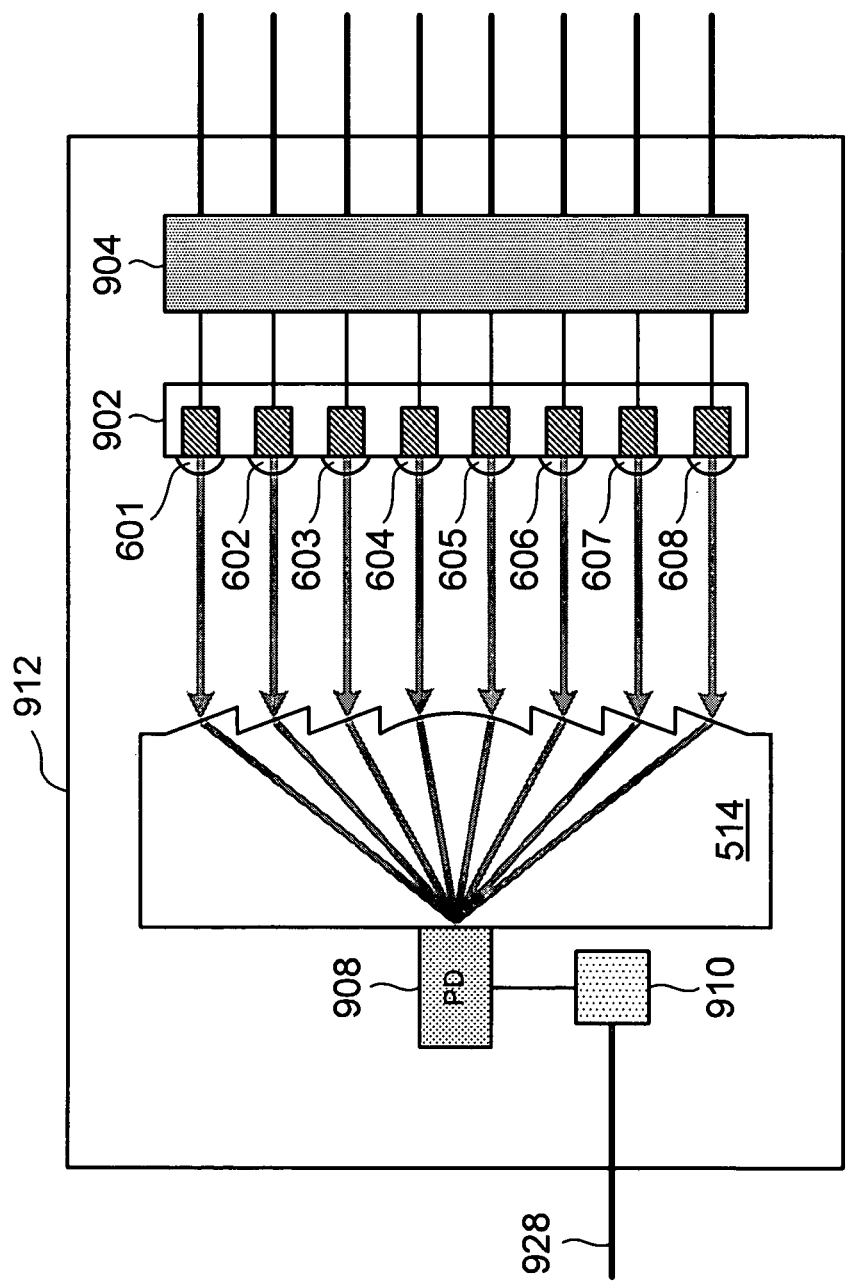
FIG. 9B shows a fan-in optical interconnect employing a focusing element and plano-convex rings in accordance with embodiments of the present invention.

In certain embodiments, the optical elements 502 and 514 described above with reference to FIGS. 5A-5C can be configured to direct the optical signals output from the lasers of the laser array 902 to the photodetector 908. In other embodiments, the plano-convex lens 601-608 described above with reference to FIG. 6 can also be included to focus the optical signals emitted by the lasers of the laser array 902 onto the prisms of the focusing element 502 or the Fresnel rings of the focusing 1 element 514. For example, FIG. 9B shows a fan-in optical interconnect employing the focusing element 514 and the plano-convex rings 601-608 in accordance with embodiments of the present invention.

The fan-in optical interconnect 900 can be operated as follows. An arbiter directs an electronic device in the stack 110 to output a modulated electrical signal onto the signal line 916. The laser driver 904 receives the modulated electrical signal and directs the laser 914 to emit a corresponding modulated optical signal 926 which is redirected by the focusing element 906 to the photodetector 908. The photodetector 908 converts the modulated optical signal 926 into a modulated electrical signal that is amplified by the transimpedance amplifier 910 and transmitted to the electronic device 102 on the signal line 928. This operation can then be repeated for a different electronic device in the stack 110.

Figure 10A:
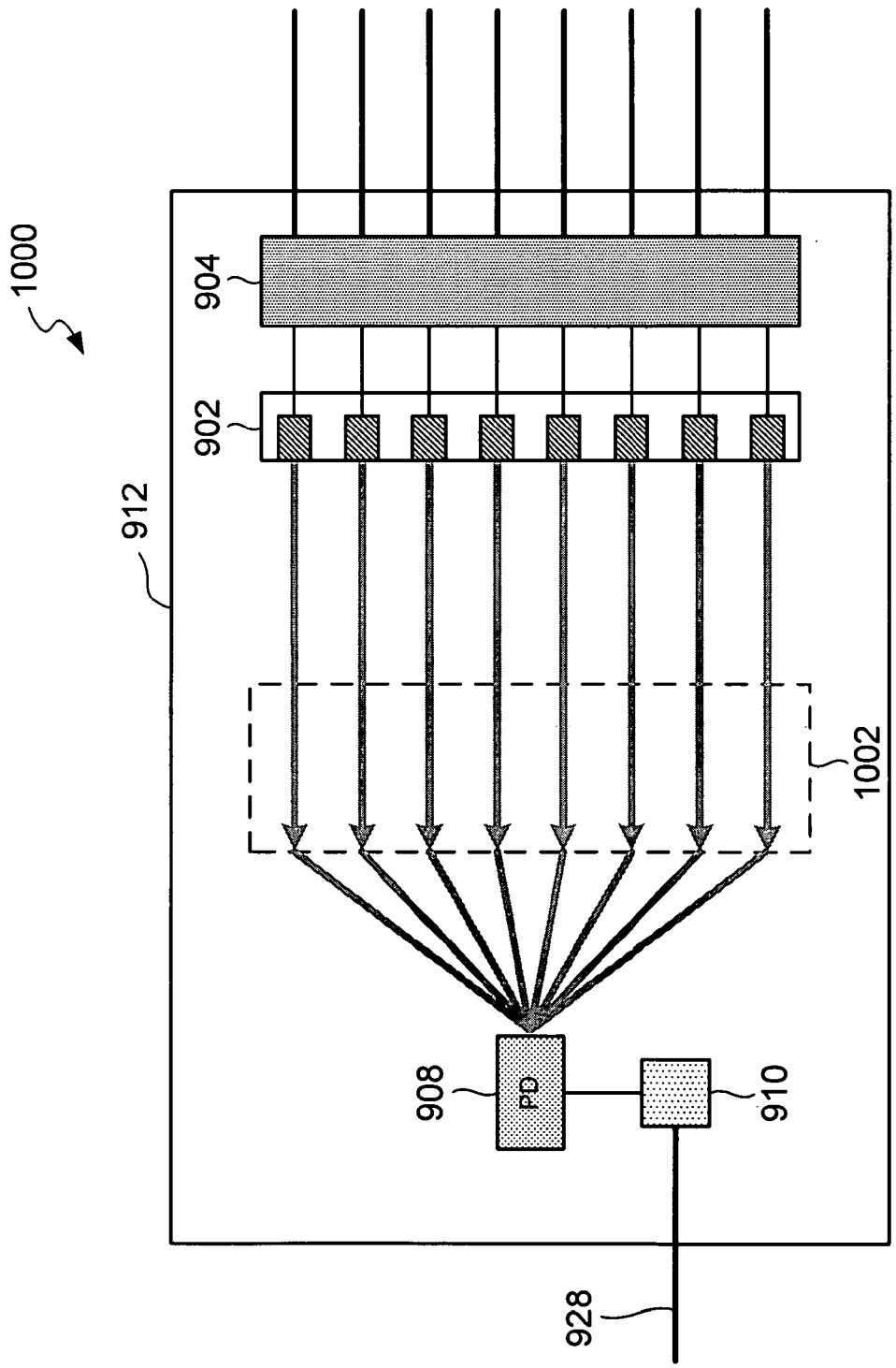
FIG. 10A shows a schematic representation of a second fan-in optical interconnect card configured in accordance with embodiments of the present invention.
Figure 10B:
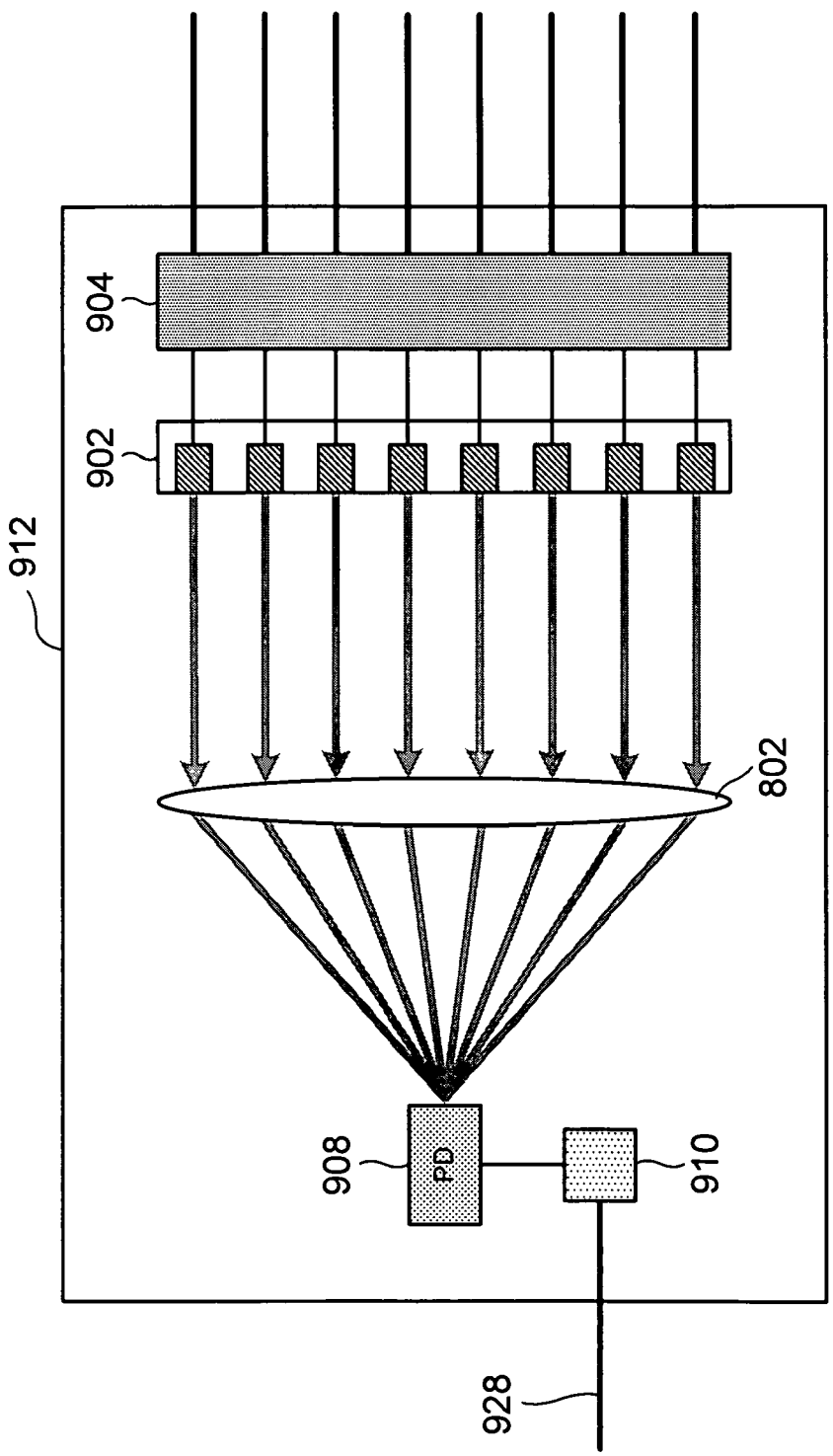
FIGS. 10B-10D show different focusing elements that can be employed to direct optical signals output from a laser array to a photodetector in accordance with embodiments of the present invention.
Figure 10C:
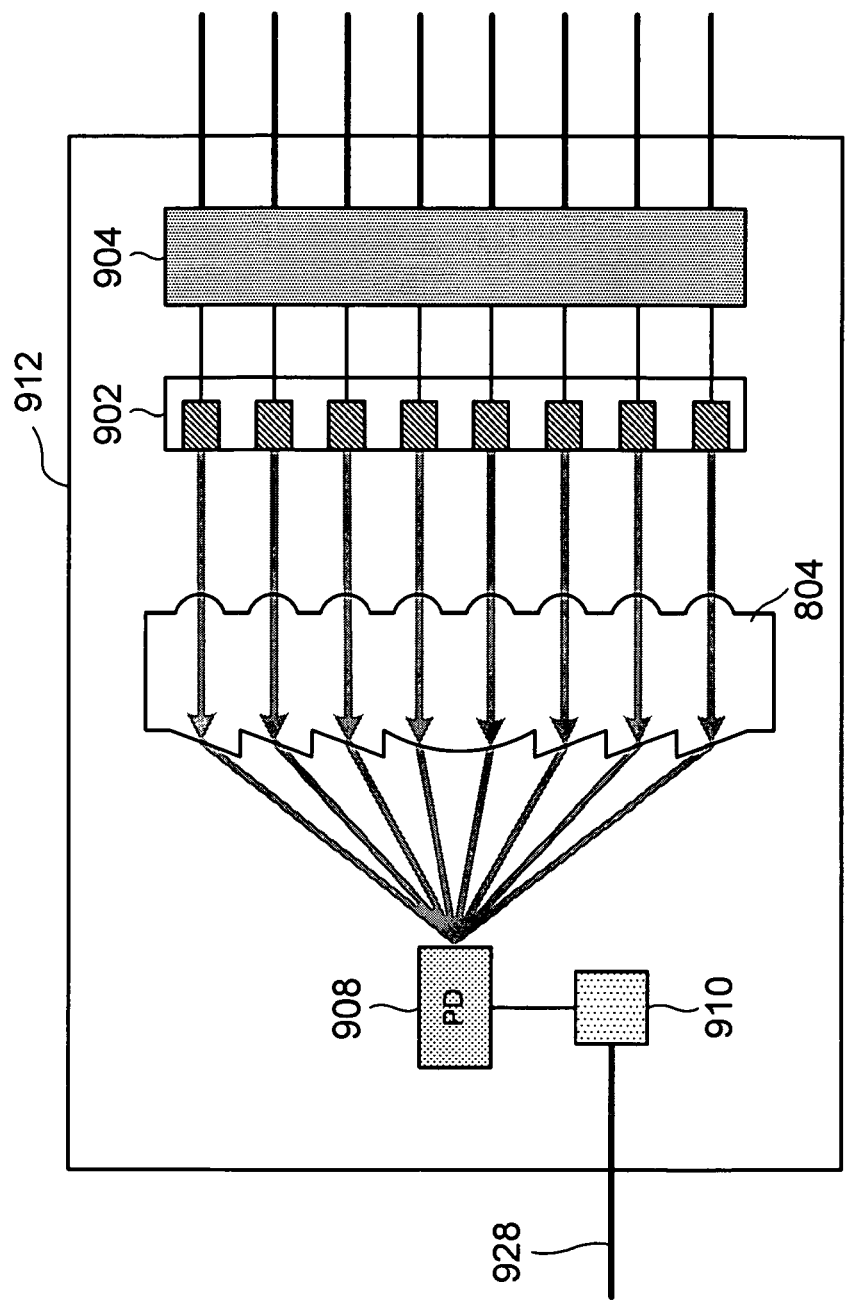
Figure 10D:
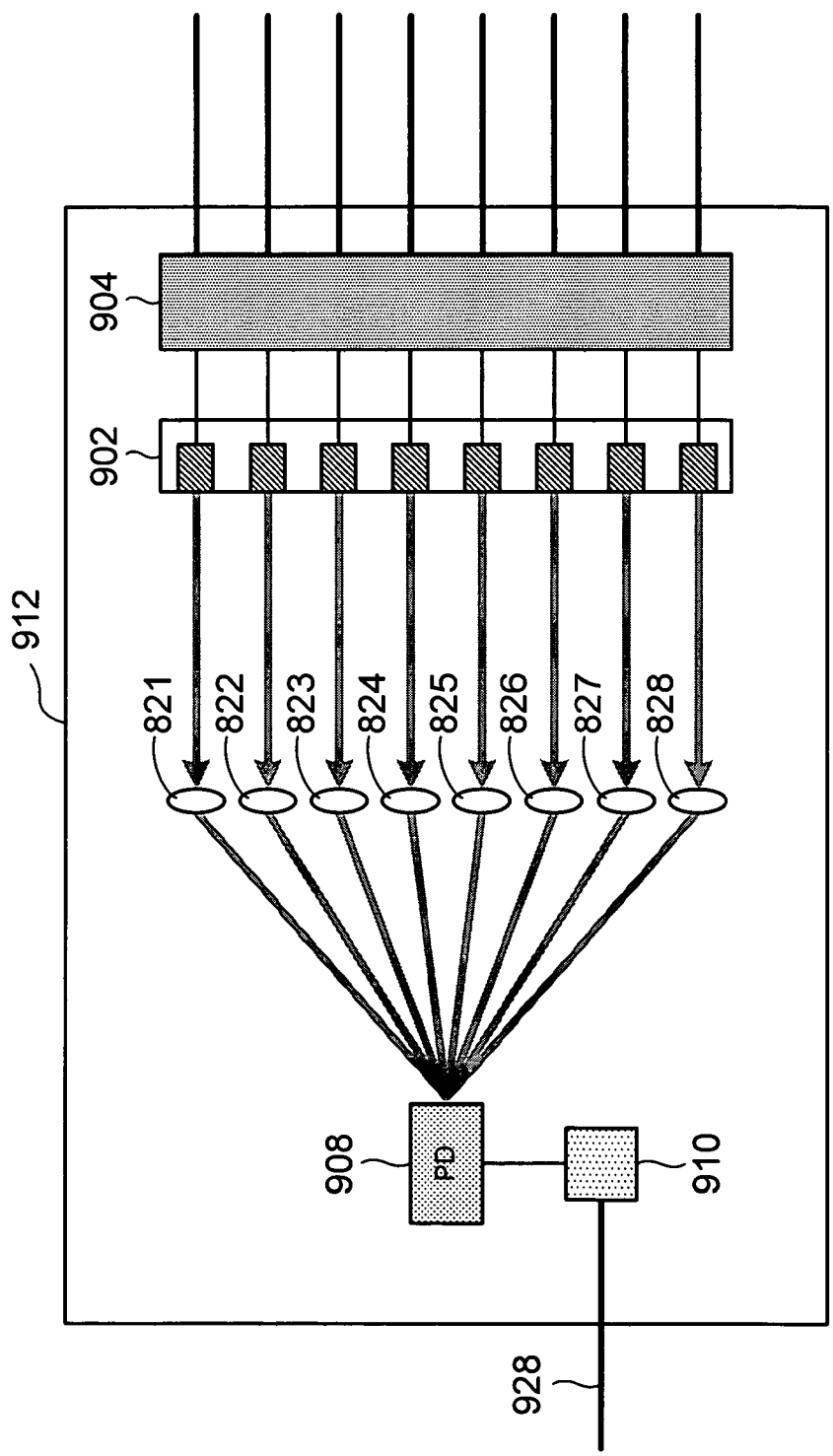

FIG. 10A shows a schematic representation of a second fan-in optical interconnect card 1000 configured in accordance with embodiments of the present invention. The optical interconnect 1000 is nearly identical to the optical interconnect 900 except an optical element 1002 is disposed on the surface of the substrate 912 between the photodetector 908 and the laser array 902. In certain embodiments, the focusing elements 802, 804, and 821-828 described above with reference to FIGS. 8A-8C can be configured to direct the optical signals output from the lasers of the laser array 902 to the photodetector 908. FIGS. 10B-10D show the focusing elements 802, 804, and 821-828 employed to direct the optical signals output from the lasers of the laser array 902 to the photodetector 908 in accordance with embodiments of the present invention.

Figure 11:
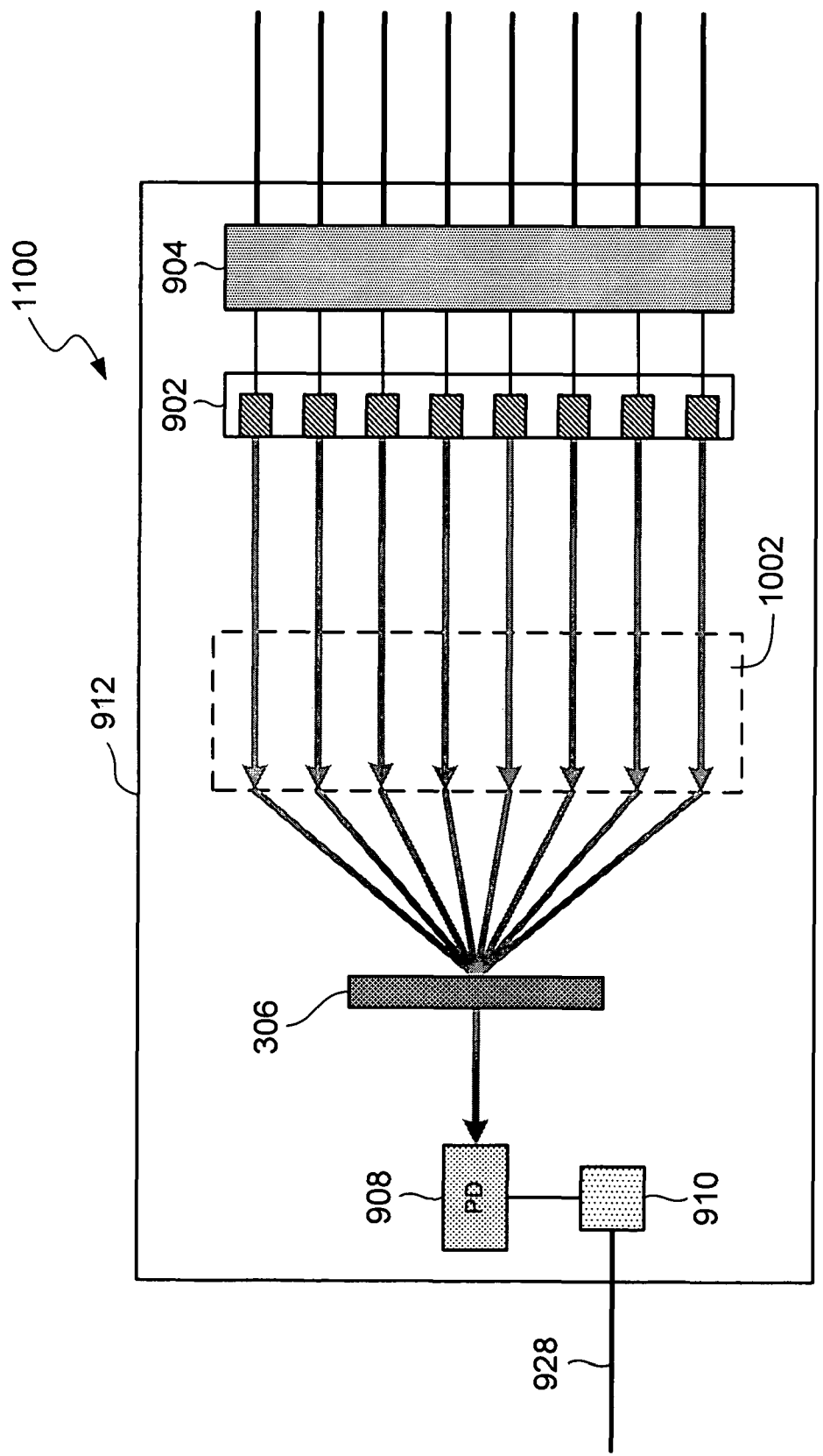
FIG. 11 shows a schematic representation of a third fan-in optical interconnect card configured in accordance with embodiments of the present invention.

FIG. 11 shows a schematic representation of a third fan-in optical interconnect card 1100 configured in accordance with embodiments of the present invention. The optical interconnect 1100 is nearly identical to the optical interconnect 1000 except the diffractive optical element 306 is disposed on the surface of the substrate 912 between the photodetector 908 and the focusing element 1002. The diffractive optical element 306 can be used in this embodiment to direct optical signals onto the photodetector 908.

Figure 12A:
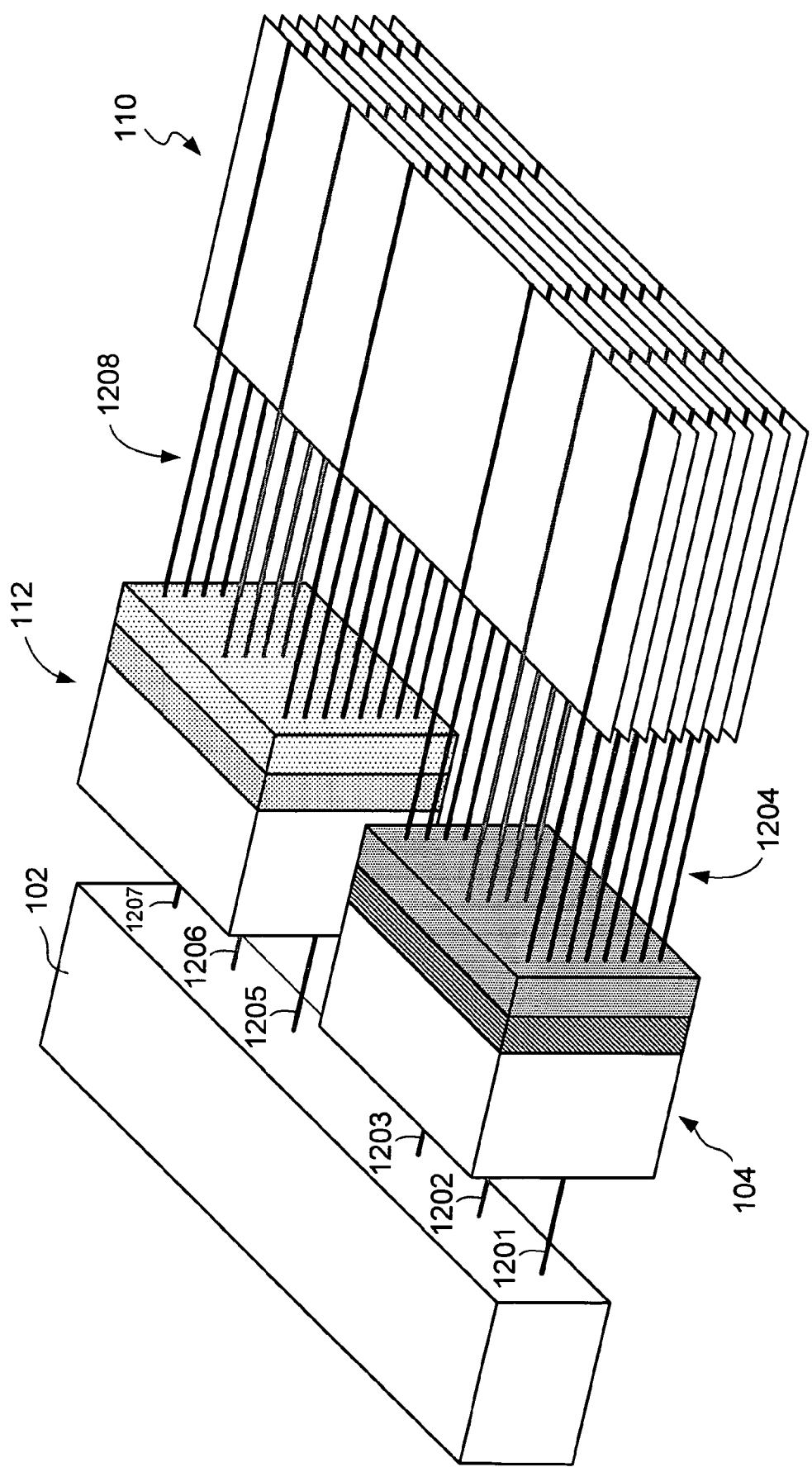
FIG. 12A shows an isometric view and schematic representation of a second fan-out optical interconnect and a fan-in optical interconnect configured in accordance with embodiments of the present invention.

FIG. 12A shows an isometric view and schematic representation of a second fan-out optical interconnect and a fan-in optical interconnect configured in accordance with embodiments of the present invention. The fan-out optical interconnect 104 is implemented using a single device that can receive three different electrical signals on corresponding signal lines 1201-1203 and broadcast electrical signals to each of the electronic devices in the stack 110 on three corresponding columns of eight signal lines, such as column 1204. The fan-in optical interconnect 112 is also implemented using a single device that can receive electrical signals form each of the electronic devices in the stack 110 on three columns of eight signal lines, such as column 1208, and transmit the electrical signals to the electronic device 102 on three corresponding signal lines 1205-1207.

Figure 12B:
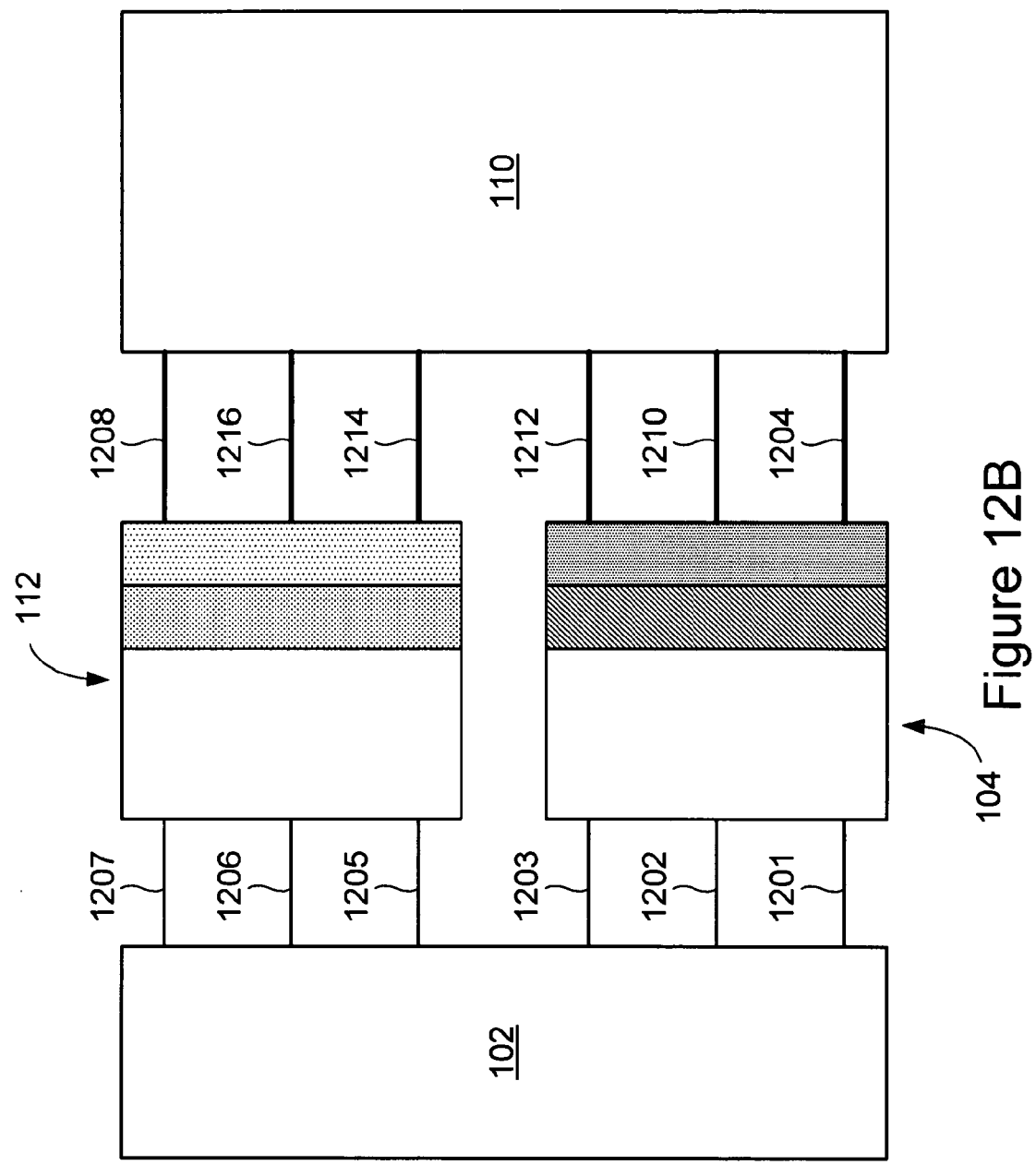
FIG. 12B shows a top-view of the fan-in and fan-out optical interconnects shown in FIG. 12A in accordance with embodiments of the present invention.

FIG. 12B shows a top-view of the fan-in and fan-out optical interconnects shown in FIG. 12A in accordance with embodiments of the present invention. FIG. 12B reveals that the columns of signal lines interconnecting the fan-out and fan-in optical interconnects with the electronic devices in the stack 110 are substantially aligned with the signal lines interconnecting the fan-out and fan-in optical interconnects with the electronic device 102. The fan-out optical interconnect 104 receives electrical signals on the signal lines 1201-1203 and correspondingly broadcast these electrical signals on the columns of signal lines 1204, 1210, and 1212. For example, the fan-out optical interconnect 104 receives electrical signals on the signal line 1201 and broadcasts the electrical signal on the signal lines on the column of signal lines 1204. The fan-in optical interconnect 112 can receive electrical signals on each of the signal lines of the columns of signal lines 1214, 1216, and 1208 and correspondingly transmit the electrical signals to the electronic device 102 over the signals line 1205-1207. For example, the fan-in optical interconnect 112 can receive an electrical signal on one of the signal lines of the column of signal lines 1208 and transmit the electrical signal to the electronic device 102 over the signal line 1207.

Note that the fan-out and fan-in optical interconnects of the present invention are not limited to three columns of signal lines and three corresponding signal lines shown in FIG. 12. In other embodiments, the fan-out and fan-in optical interconnects can be implemented with any number of columns of signal lines and corresponding signal lines. Furthermore, each column of signal lines may include any suitable number of signal lines needed to transmit electrical signals to and from the same number of electronic devices in a stack.

Figure 13:
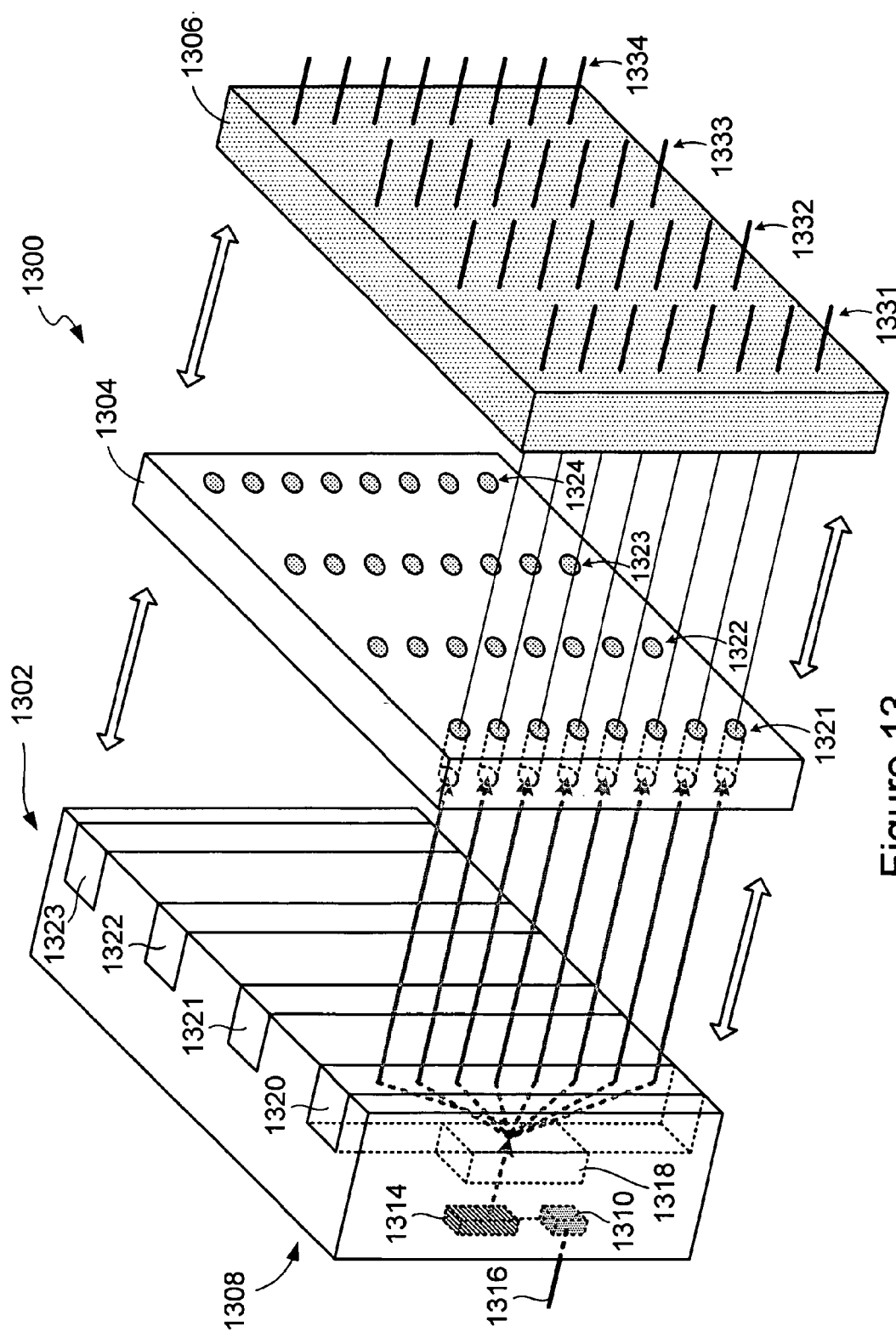
FIG. 13 shows an exploded isometric view of a two-dimensional fan-out optical interconnect configured in accordance with embodiments of the present invention.

FIG. 13 shows an exploded isometric view of a two-dimensional fan-out optical interconnect 1300 configured in accordance with embodiments of the present invention. The optical interconnect 1300 comprises an optical signal generating system 1302, a two-dimensional photodetector array 1304, and a two-dimensional transimpedance amplifier 1306. The system 1302 comprises four optical signal generating devices, such as optical signal generating device 1308, embedded in glass or another suitable transparent material. Each optical signal generating devices includes a laser, a laser driver, a diffractive optical element, and a focusing element. For example, the optical signal generating device 1308 includes a laser driver 1310 that receives electrical signals over a signal line 1312, a laser 1314 electronically coupled to the laser driver 1310, a diffractive optical element 1318, and a focusing element 1320. Each of the optical signal generating devices generates eight separate, nearly identical, and approximately equidistant optical signals, as described above with reference to the fan-out optical interconnect cards shown in FIGS. 4-8. In different embodiments, the focusing elements 1320-1323 can be the focusing elements 502, 514, 802, 804, and 821-828. In still other embodiment, the focusing elements can be eliminated. The photodetector array 1304 includes four columns 1321-1324 of eight photodetectors. The photodetectors in each column are positioned to detect one of the optical signals emitted from the optical signal generating devices. The photodetectors can be p-n or p-i-n junction photodiodes, or n-p-n or p-n-p phototransistors. The photodetectors of the photodetector array 1304 are each electronically coupled to the transimpedance amplifier 1006 which amplifies the electrical signal output from each of the photodetectors and places the electrical signals on the corresponding columns of signal lines 1331-1334.

Figure 14:
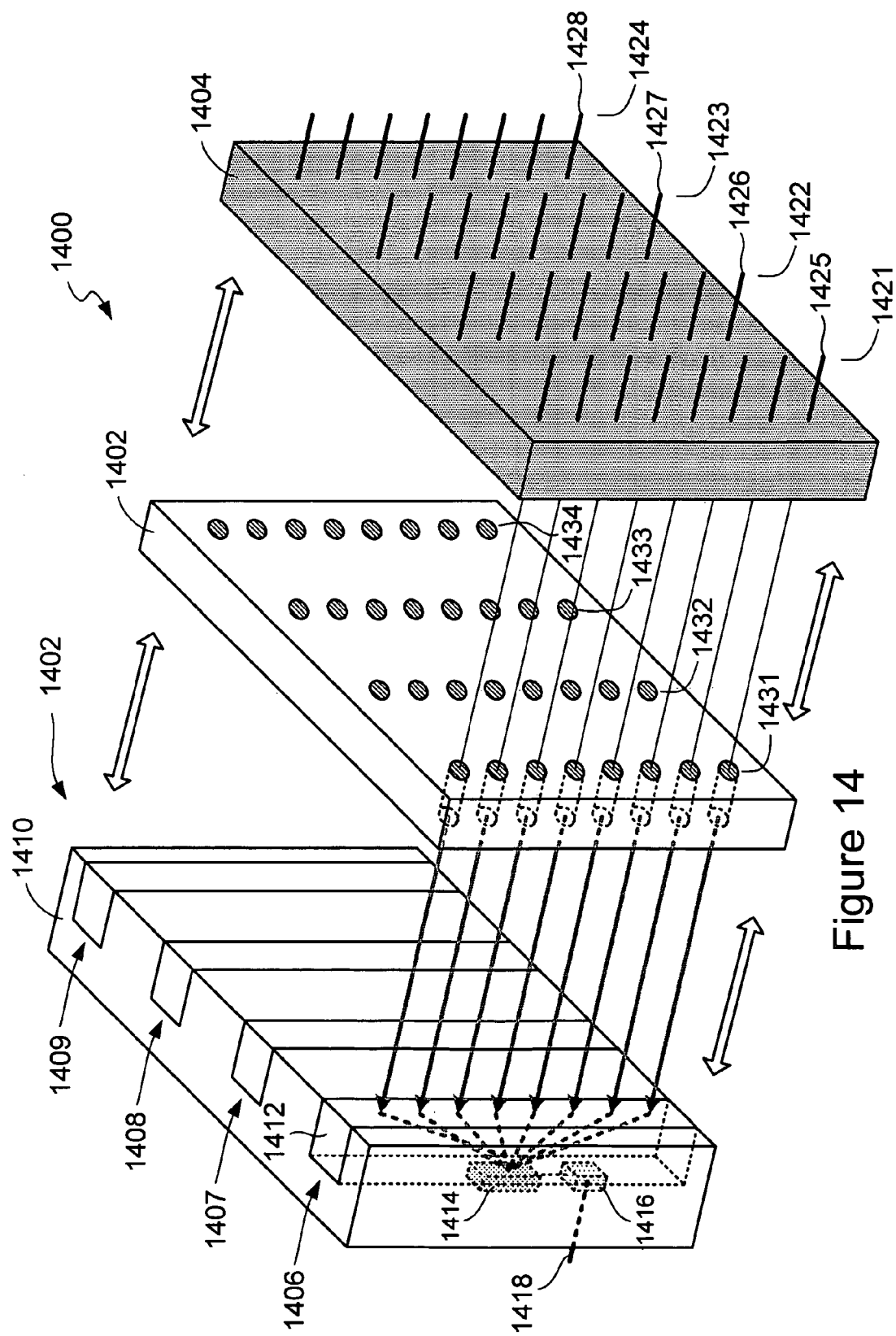
FIG. 14 shows an exploded isometric view of a two-dimensional fan-in optical interconnect configured in accordance with embodiments of the present invention.

FIG. 14 shows an exploded isometric view of a two-dimensional fan-in optical interconnect 1400 configured in accordance with embodiments of the present invention. The optical interconnect 1400 comprises a two-dimensional laser array 1402, a two-dimensional laser driver 1404, and four photodetector systems 1406-1409 embedded in glass or another suitable transparent material 1410. Each of the four photodetectors systems 1406-1409 comprises a focusing element, a photodetector, and a transimpedance amplifier. For example, the photodetector system 1406 comprises a focusing element 1412, a photodetector 1414, and a transimpedance amplifier 1416 electronically coupled to a signal line 1418. In different embodiments, the focusing elements 1320-1323 can be the focusing elements 502, 514, 802, 804, and 821-828 and operated as described above with reference to FIGS. 9-10. The photodetectors can be p-n or p-i-n junction photodiodes, or n-p-n or p-n-p phototransistors. The laser driver 1404 is electronically coupled to columns of signal lines 1421-1424. Each signal line within a column of signals lines receives electrical signals output from one of the electronic devices in the stack 110. For example, the bottom signals lines 1425-1428 all receives electrical signals from the bottom electronic device of the stack 110. However, an arbiter can be used to ensure that only one signal line within a column receives an electrical signal at a time. The signal lines in each column of signal lines 1421 are correspondingly electronically coupled to the lasers in the columns of lasers 1431-1434 of the laser array 1402. For example, each of the signal lines in the column of signal lines 1421 are correspondingly electronically coupled to the lasers in the column of lasers 1431 and provide the electrical signals that drive the lasers in the column of lasers 1431. The lasers in columns of lasers 1431-1434 are configured and positioned within the laser array 1402 to emit optical signals that are directed to a corresponding focusing element. Each focusing element transmits the optical signal to a corresponding photodetector, which, in turn, generates a corresponding electrical signal that is amplified by an electronically coupled transimpedance amplifier and outputs the electrical signal on a corresponding signal line. For example, as shown in FIG. 14, the lasers in the column of lasers 1431 are configured and positioned so that each laser emits a optical signal that strikes the focusing element 1412. The focusing element 1412 is configured to direct the optical signal to the photodetector 1414 which generates a corresponding electrical signal that is amplified by the transimpedance amplifier 1416 and output on the signal line 1418.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optical interconnect comprising:
a laser configured to output an optical signal;
a laser driver electronically coupled to the laser, wherein the laser driver induces the laser to output the optical signal in response to an electrical signal received by the laser driver;
a diffractive optical element positioned to receive the optical signal and configured to split the optical signal into a plurality of approximately identical optical signals received by a focusing optical element comprising a Fresnel lens surface and an opposing surface having a plurality of plano convex lenses; and
a photodetector array, wherein each photodetector of the photo detector array converts one of the plurality of optical signals into an electrical signal that is output on a separate signal line.

2. The interconnect of claim 1 further comprises a transimpedance amplifier electronically coupled to the array of photodetectors, the trans impedance amplifier amplifies the electrical signals output from the photodetector of the photodetector array.

3. The interconnect of claim 1 wherein the laser driver further comprises an integrated circuit configured to supply a modulated current to the laser in response to the modulated intensity of the electrical signal received by the laser driver.

4. The interconnect of claim 1, in which each of the plurality of plano-convex lenses formed in the opposing surface focuses one of the plurality of approximately identical optical signals onto a photodetector in the photodetector array.

5. The interconnect of claim 1, further comprising a fan-in interconnect and a fan-out interconnect, in which the fan-in interconnect is separate from the fan-out interconnect, the fan-out interconnect comprising the laser, laser driver, diffractive optical element and photodetector array.

6. The interconnect of claim 1, wherein the Fresnel lens surface is to redirect the approximately identical optical signals along substantially parallel paths through the diffractive optical element and the plano convex lenses focus the identical optical signals on the photodetectors in the photodetector array.

7. The interconnect of claim 1, further comprising:
a plurality of separate electronic devices;
a fan-in interconnect comprising:
a plurality of lasers, each laser configured to emit a corresponding optical signal;
a plurality of lasers drivers, each laser driver electronically coupled to one of the plurality of lasers such that each laser driver induces a corresponding laser to emit the corresponding optical signal in response to an electrical signal received by the laser driver from one of the electronic devices;
a second focusing element positioned to receive the plurality of optical signals and output a single optical signal; and
a photo detector that converts the single optical signal into a single electrical signal that is output on a signal line.

8. An optical interconnect comprising:
a plurality of lasers, each laser configured to emit a corresponding optical signal, the optical signals of the lasers being emitted parallel to each other;
a plurality of lasers drivers, each laser driver electronically coupled to one of the plurality of lasers such that each laser driver induces a corresponding laser to emit the corresponding optical signal in response to an electrical signal received by the laser driver;
a plurality of separate electronic devices, each separate electronic device connected to one of the laser drivers, the electronic devices supplying the electrical signal to the laser drivers;
a focusing element positioned to receive the plurality of parallel optical signals and direct them to a diffraction optical element to output a single optical signal; and
a photo detector that converts the single optical signal into a single electrical signal that is output on a signal line.

9. The interconnect of claim 8 wherein the focusing element further comprises substantially regularly spaced prisms protruding from a surface facing the plurality of lasers.

10. The interconnect of claim 8 wherein the focusing element further comprises a spherically contoured Fresnel lens surface facing the plurality of lasers.

11. The interconnect of claim 8 wherein the focusing element further comprises a lens positioned between the photodetector and the plurality of lasers such that the lens is configured to direct each of the plurality of optical signals to the photodetector.

12. The interconnect of claim 8 further comprises a plurality of lenses positioned between the photodetector and the plurality of lasers such that each lens is configured and positioned to direct one of the plurality of optical signals to the photodetector.

13. The interconnect of claim 8 further comprises a trans-impedance amplifier electronically coupled to the photo detector, the transimpedance amplifier amplifies an electrical signal output from the photodetector.

14. The interconnect of claim 8 wherein the focusing element further comprises a diffractive beam splitter that directs the plurality of optical signals into the single optical signal.

15. The interconnect of claim 8 wherein the laser driver further comprises an integrated circuit configured to supply a modulated current to one of the plurality of lasers in response to the intensity of the electrical signal received by the laser driver.

16. The interconnect of claim 8, further comprising a fan-out portion comprising a laser configured to output an optical signal, a photodetector array, and diffractive optical element positioned to receive the optical signal and configured to split the optical signal into a plurality of approximately identical optical signals directed to detectors in the photodetector array.

17. An optical interconnect system comprising:
an electronic device;
a stack of electronic devices;
a fan-out interconnect interposed between the electronic device and the stack, the fan-out interconnect comprising:
    a single laser configured to output an optical signal;
    a diffractive optical element positioned to receive the optical signal and configured to split the optical signal into a plurality of approximately identical optical signals; and
    a photodetector array, wherein each photodetector of the photo detector array converts one of the plurality of approximately identical optical signals into an electrical signal that is output on a separate signal line of one of the electronic devices in the stack; and
a fan-in interconnect comprising:
    a plurality of lasers, each laser configured to emit a corresponding optical signal;
    a plurality of laser drivers, each laser driver electronically coupled to one of the plurality of lasers such that each laser driver induces a corresponding laser to emit the corresponding optical signal in response to an electrical signal received by the laser driver from one of the electronic devices in the stack;
    a single focusing element positioned to receive the plurality of optical signals and output a single optical signal; and
    a photo detector that converts the single optical signal into a single electrical signal that is output on a signal line.

18. The system of claim 17, in which the electronic device is a computational device and the stack of electronic devices comprise memory devices, wherein the computational device is connected to the memory devices by the fan-out interconnect and the memory devices are connected to the computational device by the fan-in interconnect.

19. The system of claim 17, wherein the fan-out interconnect is separate from the fan-in interconnect and in which the fan-out interconnect is a one way communication path from the electronic device to the stack.

20. The system of claim 19, wherein the fan-in interconnect is a one way communication path from the stack to the electronic device.

21. The system of claim 17,
the focusing element comprising:
a Fresnel lens surface; and
a plurality of plano-convex lenses formed in a second, opposing surface of the focusing element facing the photodetector array.

* * * * *